United States Patent
Huang et al.

(10) Patent No.: US 12,323,884 B2
(45) Date of Patent: Jun. 3, 2025

(54) GROUP ADDRESSED DATA DELIVERY

(71) Applicant: Intel Corporation, Santa Clara, CA (US)

(72) Inventors: Po-Kai Huang, San Jose, CA (US); Daniel Bravo, Portland, OR (US); Danny Ben-Ari, Tsur Natan (IL); Danny Alexander, Neve Efraim Monoson (IL); Amir Hitron, Beit Ytzhak (IL); Ofer Schreiber, Kiryat Ono (IL); Arik Klein, Givaat Shmuel (IL); Laurent Cariou, Milizac (FR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/478,678

(22) Filed: Sep. 29, 2023

(65) Prior Publication Data

US 2024/0031777 A1    Jan. 25, 2024

Related U.S. Application Data

(63) Continuation of application No. 17/006,469, filed on Aug. 28, 2020, now abandoned.

(60) Provisional application No. 63/039,105, filed on Jun. 15, 2020, provisional application No. 62/894,073, filed on Aug. 30, 2019.

(51) Int. Cl.
*H04W 4/06* (2009.01)

(52) U.S. Cl.
CPC ..................... *H04W 4/06* (2013.01)

(58) Field of Classification Search
CPC ....................................................... H04W 4/06
See application file for complete search history.

(56) References Cited

U.S. PATENT DOCUMENTS

| | | | | |
|---|---|---|---|---|
| 11,582,716 | B2 * | 2/2023 | Huang | ............... H04L 1/188 |
| 2013/0010662 | A1 * | 1/2013 | Park | ............... H04W 84/12 |
| | | | | 370/312 |
| 2013/0235720 | A1 * | 9/2013 | Wang | ............... H04W 52/0216 |
| | | | | 370/229 |
| 2015/0373642 | A1 * | 12/2015 | Wong | ............... H04W 52/0225 |
| | | | | 370/311 |
| 2015/0382283 | A1 * | 12/2015 | Wang | ............... H04W 52/0216 |
| | | | | 370/328 |

(Continued)

*Primary Examiner* — Thomas R Cairns
*Assistant Examiner* — Kai Chang
(74) *Attorney, Agent, or Firm* — Eversheds Sutherland (US) LLP

(57) ABSTRACT

This disclosure describes systems, methods, and devices related to group addressed data delivery. A device may determine a plurality of links between one or more access points (APs) in an AP multi-link device (MLD) and one or more logical non-AP stations (STAs) in a non-AP MLD. The device may determine one or more group addressed frames to be sent from the one or more APs of the AP MLD to the one or more non-AP STAs of the non-AP MLD. The device may generate a delivery traffic indication map (DTIM) associated with each link to be used by the one or more non-AP STAs of the non-AP MLD to receive group addressed frames. The device may perform an action based on whether the non-AP MLD sent an indication that a first link of the plurality of links is selected by the non-AP MLD for receiving a first group addressed frame from the one or more group addressed frames.

20 Claims, 20 Drawing Sheets

(56) References Cited

U.S. PATENT DOCUMENTS

| | | | |
|---|---|---|---|
| 2016/0014693 A1* | 1/2016 | Patil | H04W 72/30 370/254 |
| 2016/0014714 A1* | 1/2016 | Patil | H04W 68/005 455/458 |
| 2018/0115950 A1* | 4/2018 | Asterjadhi | H04W 76/28 |
| 2019/0268847 A1* | 8/2019 | Asterjadhi | H04W 52/0216 |
| 2021/0007168 A1* | 1/2021 | Asterjadhi | H04W 52/0216 |

* cited by examiner

| Element ID | Length | Element ID Extension | Link ID bitmap |

FIG. 6

GROUP ADDRESSED DATA DELIVERY

CROSS-REFERENCE TO RELATED APPLICATION(S)

This application is a continuation of U.S. Non-Provisional application Ser. No. 17/006,469, filed Aug. 28, 2020, which claims the benefit of U.S. Provisional Application No. 62/894,073, filed Aug. 30, 2019, and U.S. Provisional Application No. 63/039,105, filed Jun. 15, 2020, the disclosures of which are incorporated herein by reference as if set forth in full.

TECHNICAL FIELD

This disclosure generally relates to systems and methods for wireless communications and, more particularly, to group addressed data delivery.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 6 depicts an illustrative schematic diagram for group addressed data delivery, in accordance with one or more example embodiments of the present disclosure.

DETAILED DESCRIPTION

Figure 1:
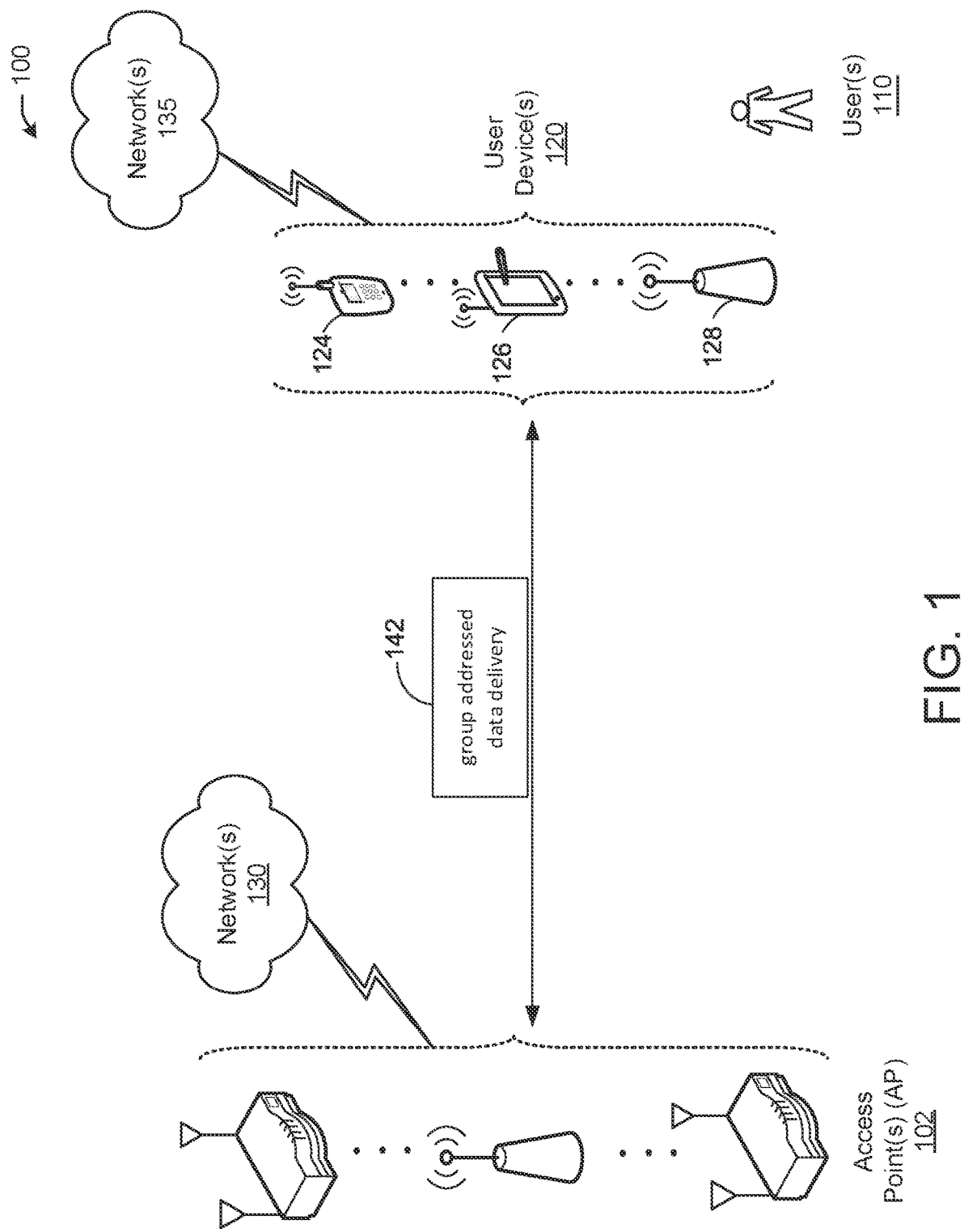
FIG. 1 is a network diagram illustrating an example network environment for group addressed data delivery, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

There are two multi-link logical entities on either side which includes multiple STAs that can set up links with each other. The detailed definition is shown below.

Multi-link logical entity: A logical entity that contains one or more STAs. The logical entity has one MAC data service interface and primitives to the LLC and a single address associated with the interface, which can be used to communicate on the DSM.

NOTE—A Multi-link logical entity allows STAs within the multi-link logical entity to have the same MAC address.

NOTE—The exact name can be changed.

For infrastructure framework, a Multi-link AP logical entity may include APs on one side, and Multi-link non-AP logical entity, which includes non-APs on the other side. The detailed definition is shown below.

Multi-link AP logical entity (AP MLLE also can be referred to as AP MLD): A multi-link logical entity, where each STA within the multi-link logical entity is an EHT AP. It should be noted that the term MLLE and MLD are interchangeable and indicate the same type of entity. Throughout this disclosure, MLLE may be used but anywhere the MLLE term is used, it can be replaced with MLD.

Multi-link non-AP logical entity (non-AP MLLE, also can be referred to as non-AP MLD): A multi-link logical entity, where each STA within the multi-link logical entity is a non-AP EHT STA.

Note that this framework is a natural extension from the one link operation between two STAs, which are AP and non-AP STA under the infrastructure framework (e.g., when an AP is used as a medium for communication between STAs).

In some scenarios, an AP and/or an STA may send group addressed messages to one or more other devices. Group addressed messages are messages that are broadcast or multicast messages that are sent in one-to-many situations. It should be understood that data, messages, and/or packets may refer to the same thing.

Delivery of a group addressed frame may be implemented in two options. Note that due to the existence of legacy STAs in each link and different target beacon transmission time (TBTT) in different links, the same group addressed frame is required to be transmitted in every link between two MLLEs (e.g., between an AP MLD and a non-AP MLD, between an AP-MLD and another AP-MLD, or between two non-AP MLDs) at different times. As a result, there is a need to have an approach to avoid duplicate reception across the plurality links. Because all the links may carry a duplicate GA frame(s) that may be sent at different times on different links, the receiving device may receive these duplicated GA frame(s), then if the receiving device changes the link where it is expecting GA frames (e.g., from a first link to a second link), then two situations may occur. One is that the receiving device may have received the GA frames on the first link and then when it switches to the second link, it may receive a duplicate on the second link because the AP MLD was sending the duplicates on that second link at a time that happens to be after the non-AP MLD had changed the link. The second situation is that the non-AP MLD may miss the reception of the GA frames if the non-AP MLD switches before receiving the GA frames on the first link and then when the non-AP MLD switches to the second link, the AP MLD sends the GA frames on the first link because it had already sent it on the second link before the non-AP MLD started using that second link.

In one or more embodiments, a group addressed data delivery system may facilitate that a non-AP MLLE only takes the group addressed frame in one link at a time. Then additional mechanisms may be needed to address how to change the configuration between AP MLLE and non-AP MLLE of the link to receive group addressed frame and deal with the group addressed duplicate or missing problem. There may be two options to solve this problem.

Option 1: shared sequence number (SN) across links for group addressed frame. In this option, a solution may be to develop additional reordering operation without negotiation based on shared SN space so that duplicate group addressed frame can be identified.

Option 2: not shared SN space. In this option, a solution may be to restrict when to change the link (e.g., link 1 to link 2 or vice versa) to receive a group addressed frame such that duplicate group addressed frame reception can be avoided. Further, a solution may be to restrict when to change the link to receive group addressed frame such that missing group addressed frame reception can be avoided.

For both option 1 and option 2, an AP MLLE also has a requirement to know which link that the non-AP MLLE is used to receive group addressed frame. As a result, AP MLLE can transmit required multicast traffic to the non-AP MLLE only in the required link.

For option 1, an advanced reordering operation is required on the receiver end to complete the design. There is also missing criteria for the mixture of quality of service (QoS) group addressed traffic and non-QoS group addressed traffic.

For option 2, there is a problem that non-AP MLLE does not exactly know when to change the link to receive group addressed frame because non-AP MLLE does not observe all the group addressed transmission history of all the links set up with AP MLLE. For AP MLLE, it also does not know the group addressed reception history of non-AP MLLE. It should be noted that the term MLLE and MLD are interchangeable and indicate the same type of entity.

There are solutions to deal with missing and duplicate group addressed frame reception based on shared SN space or not shared SN space for group addressed frame.

The solutions are when the SN space of group addressed is not shared requires non-AP MLD to indicate to AP MLD the link to receive group addressed frame. However, the idea of requiring an indication of the link to receive group addressed frame is considered a burden and not favored by some of the members.

When the SN space of group addressed is shared, it requires AP MLD to coordinate SN space assignment for group addressed management frame, individual addressed management frame to legacy STA, and non-QoS data frame in each link, which does not require shared SN space since shared SN space does not provide additional benefits for the delivery of group addressed management frame, individual addressed management frame to legacy STA, and non-QoS data frame in each link. Individual addressed management frame means that a frame is sent individually to a specific STA.

The solution to address missing group addressed data frame when changing links to receive group addressed data frame.

These solutions have some impact shared SN space: requires shared SN space for individual addressed management frame for legacy, non-QoS Data. Not Shared SN space: requires non-AP MLD to indicate the link to receive group addressed frame.

These solutions require complicated signaling to handle missing group addressed data frame when changing a link to receive group addressed data frame.

Example embodiments of the present disclosure relate to systems, methods, and devices for group addressed data delivery for multi-link operation.

In one or more embodiments, a group addressed data delivery system may facilitate that for both option 1 and option 2, non-AP MLLE sends a frame requiring acknowledgment to notify change of link to receive group addressed frame.

In one or more embodiments, a group addressed data delivery system may facilitate additional rule for option 1 to complete all the requirements of dealing with a duplicate group addressed frame across links under quality of service (QoS) or non-QoS group addressed traffic.

In one or more embodiments, a group addressed data delivery system may facilitate for option 2:
  The notification can be expanded to a handshake between AP MLLE and non-AP MLLE.
  Some mapping of group addressed frame transmission and reception status can be added to help avoid duplicate or missing group addressed frame.

In one or more embodiments, a group addressed data delivery system may facilitate for option 1, the rule is complete for QoS or non-QoS group addressed traffic.

For option 2, there is no need to develop complicate receiver reordering or SN assignment on transmitter side like option 1. There is a more specific rule and less restriction on when a non-AP can change the link to receive a group addressed frame.

Example embodiments of the present disclosure relate to systems, methods, and devices for Multi-link missed and duplicate group addressed data avoidance.

In one or more embodiments, a group addressed data system may facilitate enhancement for at least the following two solutions:

1. For Shared SN space of group addressed data frame across links. It is proposed to only share SN space for group addressed data frame but does not share SN space for other categories of frames like group addressed management frame, non-QoS data, and individual addressed management frame for legacy STA. In the proposal, to avoid legacy STA see overlapping shared SN space from group addressed data and other categories, it is proposed to have group addressed data frame uses half of the SN space and other categories of frames use another half of the SN space independently in each link.

2. For Not Shared SN space of group addressed data frame across links. AP MLD indicates information of pending group addressed buffered data in other links so that non-AP MLD that does not indicate the link to receive group addressed data can still handle duplicate detection of group addressed data frame.

> When SN space of the group addressed data frame is shared across links, other categories of frames (group addressed management, individual addressed management for legacy, non-QoS), which currently share SN space with a group addressed data frame does not need to share SN space across links.
>
> When SN space of the Group addressed data frame are not shared across links, duplicate detection can be done when the non-AP MLD does not indicate the link to receive group addressed data frame.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of group addressed data delivery, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 10:
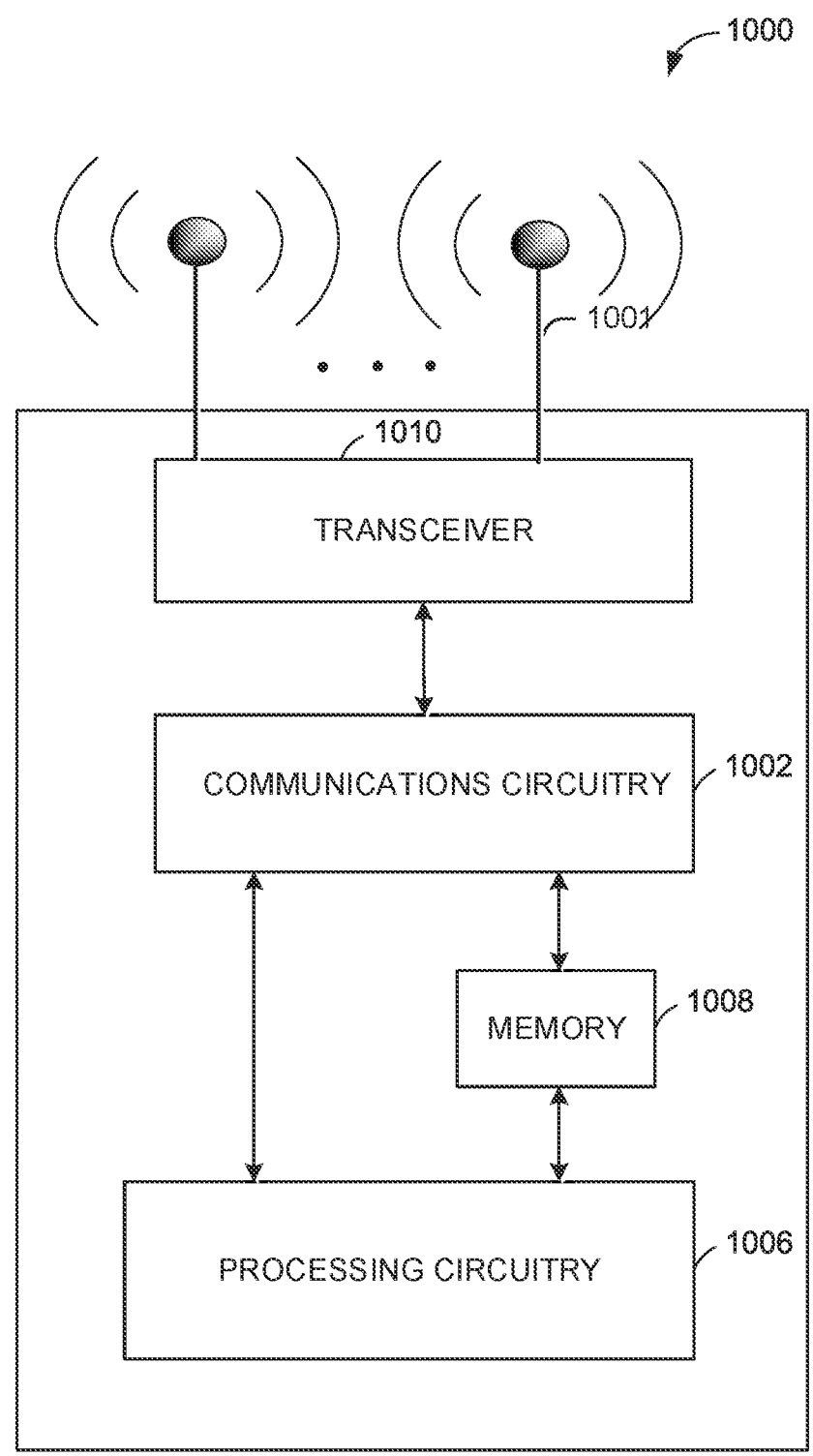
FIG. 10 illustrates a functional diagram of an exemplary communication station that may be suitable for use as a user device, in accordance with one or more example embodiments of the present disclosure.
Figure 11:
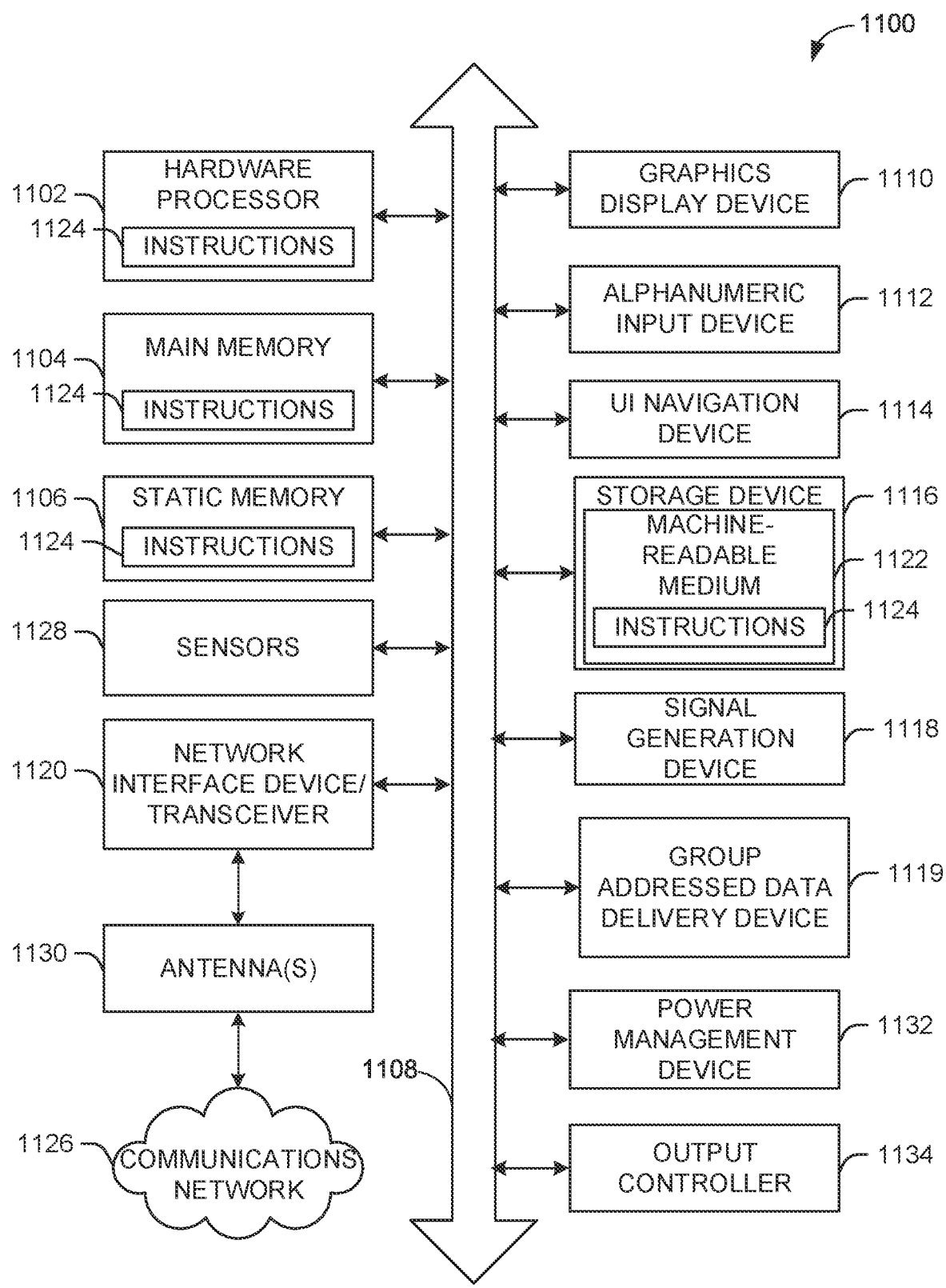
FIG. 11 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 10 and/or the example machine/system of FIG. 11.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate group addressed data delivery 142 with one or more user devices 120.

It is understood that the above descriptions are for purposes of illustration and are not meant to be limiting.

Figure 2:
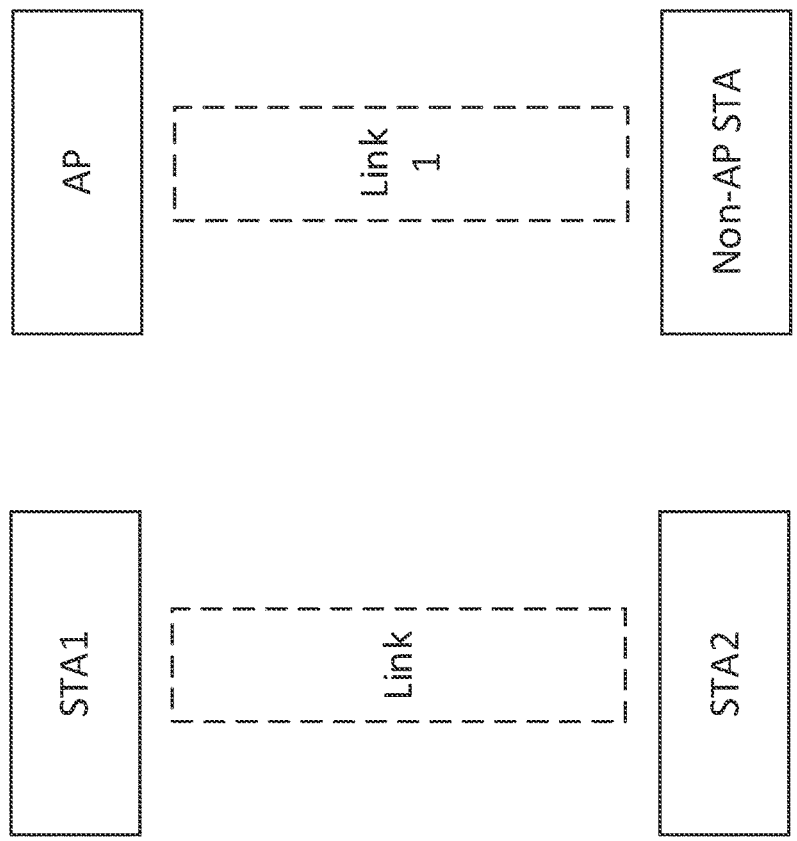
FIG. 2 depicts an illustrative schematic diagram for a traditional single link operation.

FIG. 2 depicts an illustrative schematic diagram 200 for a traditional single link operation.

Referring to FIG. 2, there is shown that under traditional single link operation, when the link is setup through association, each station device (STA) can send individual addressed data for any traffic identifier (TID) without block acknowledgment (BA) negotiation to each other. The data stream of each TID (for individual addressed data) is sent by the transmitter in order since the receiver cannot do reorder for "out of order" data packets. Specifically, each transmitter sends one data packet with a sequence number x until it is acknowledged or dropped due to too many retry, then the transmitter continues with sending the sequence number larger than x (e.g., x+1, etc.).

For group addressed data without block ack negotiation, there are three methods:

The first method is Groupcast without retries. In this case, group addressed data are just transmitted in sequence. Therefore, there is no data is resent due to lack of acknowledgment or indication from the transmitter that the packet is lost. In that case, all the packets are sent in sequence.

Two methods are used under Groupcast with retries (GCR):

The second method may be a Direct Multicast Service (DMS): in this case, group addressed data are converted to individual addressed data.

The third method may be a GCR unsolicited retry: in this case, group addressed data with sequence number x are retried for a fixed amount of times without any acknowledgment before moving on to the next group addressed data with sequence number larger than x.

As a background to the above, a retry rule is described as follows: A SRC (Short Retry Counter) is associated with each MAC service data unit (MSDU) or MAC management protocol data unit (MMPDU). Then a retry continues for each failing frame exchange until the transmission is successful or until the retry limit is reached, whichever occurs first.

A QoS STA shall maintain a short retry counter for each MSDU, A-MSDU, or MMPDU that belongs to a TC that requires acknowledgment.

After transmitting a frame that requires an immediate acknowledgment, the STA shall perform either of the acknowledgment procedures, as appropriate. The short retry counter for an MSDU or A-MSDU that is not part of a block ack agreement or for an MMPDU shall be incremented every time transmission fails for that MSDU, A-MSDU, or MMPDU, including of an associated RTS.

All retransmission attempts by a non-DMG STA for an MPDU with the Type subfield equal to Data or Management that is not sent under a block ack agreement and that has failed the acknowledgment procedure one or more times shall be made with the Retry subfield set to 1.

Retries for failed transmission attempts shall continue until one or more of the following conditions occurs:
- The short retry count for the MSDU, A-MSDU, or MMPDU is equal to dot11ShortRetryLimit.
- The short drop-eligible retry count for the MSDU, A-MSDU, or MMPDU is equal to dot11ShortDEIRetryLimit.
- The long drop-eligible retry count for the MSDU, A-MSDU, or MMPDU is equal to dot11LongDEIRetryLimit.
- The unsolicited retry count for the A-MSDU is equal to dot11UnsolicitedRetryLimit.

When any of these limits is reached, retry attempts shall cease, and the MSDU, A-MSDU, or MMPDU shall be discarded.

With the exception of a frame belonging to a TID for which block ack agreement is set up, a QoS STA shall not initiate the transmission of any Management or Data frame to a specific RA while the transmission of another Management or Data frame with the same RA and having been assigned its sequence number from the same sequence counter has not yet completed to the point of success, retry fail, or other MAC discard (e.g., lifetime expiration).

Based on receiver caches, the receiver records at least the most recent cache entry per <Address 2, TID> pair in this cache. Each entry is indexed by: <Address 2, TID, sequence number, fragment number>.

Then the receiver STA shall discard the frame if the Retry subfield of the Frame Control field is 1 and it matches an entry in the cache.

Note that for individual addressed data, there are independent sequence number space for different TIDs. Then for group addressed data, there are one sequence number space for all TIDs shared together with non-QoS data.

Also note that the receiver record does not differentiate individual addressed, where A1 is the individual address, or group addressed, where A1 is multicast address or broadcast address. The reason is that the transmitter will always move on sequence number space if finishing the current transmission.

Figure 3A:
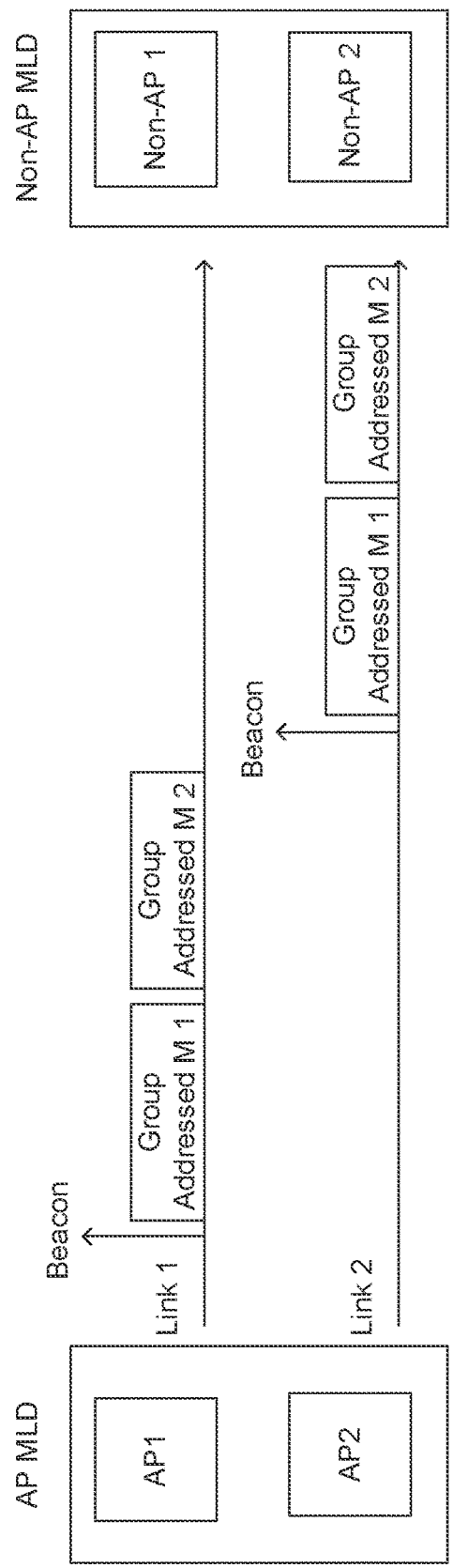
FIGS. 3A-3C depict illustrative schematic diagrams for group addressed data delivery, in accordance with one or more example embodiments of the present disclosure.
Figure 3B:
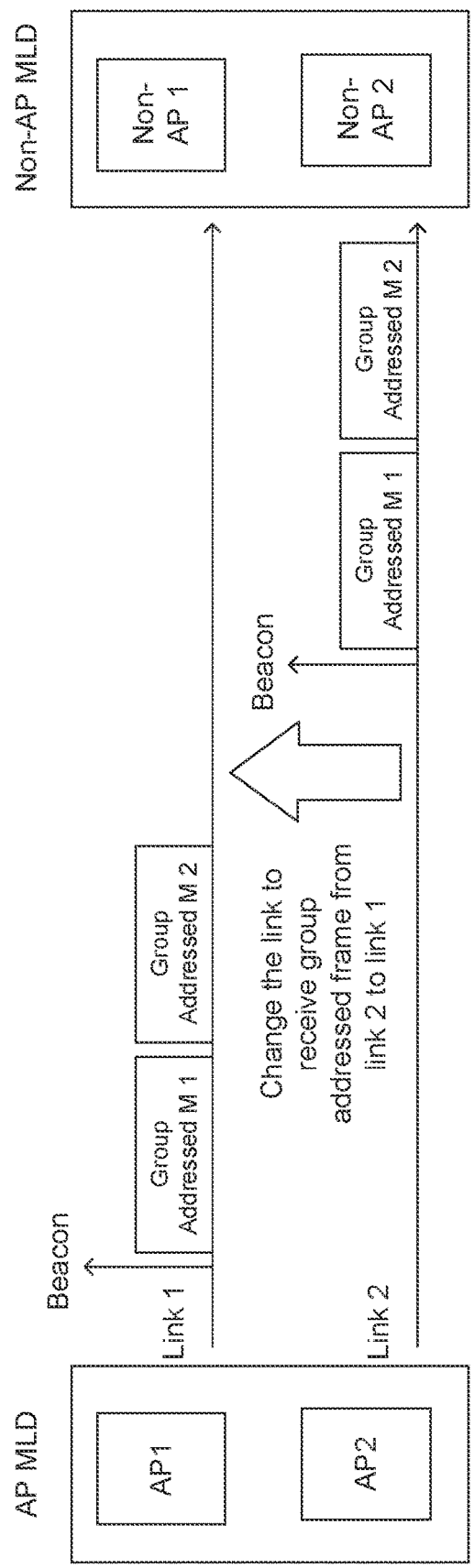
Figure 3C:
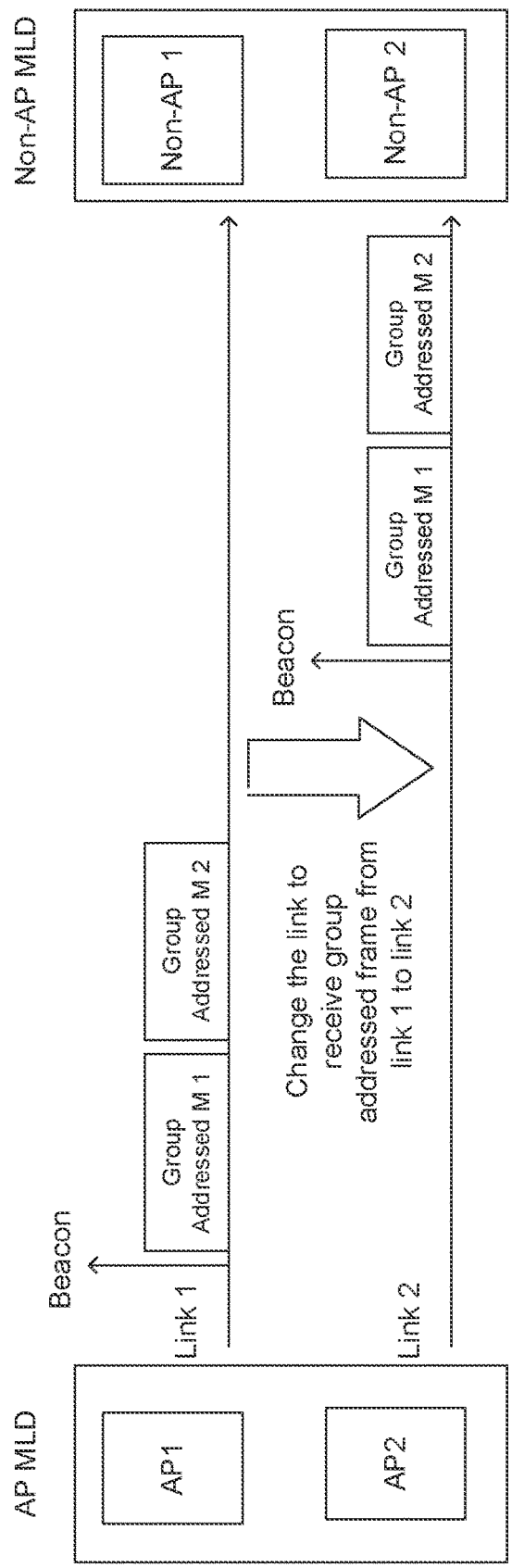

FIGS. 3A-3C depict illustrative schematic diagrams for group addressed data delivery, in accordance with one or more example embodiments of the present disclosure.

In one or more embodiments, the delivery of the group addressed frame is implemented in two options. Note that due to the existence of legacy STAs in each link and different TBTT in different links, the same group addressed frame is required to transmit in different links at different times. As a result, there needs to have an approach to avoid duplicate reception across links. A general proposal is that a non-AP MLLE only takes the group addressed frame in one link at a time. Then an additional mechanism is needed to address how to change the configuration between AP MLLE and non-AP MLLE of the link to receive group addressed frame and deal with the group addressed duplicate or missing problem (see diagram 300 of FIG. 3A). If non-AP MLLE changes the link to receive group addressed frame from link 2 to link 1 at a certain time, then the non-AP MLLE may miss M1 and M2.

FIG. 3B shows an example diagram 350 of missing group addressed frames.

In one or more embodiments, if non-AP MLLE changes the link to receive group addressed frame from link 1 to link 2 at a certain time, then the non-AP MLLE may take duplicate M1 and M2.

FIG. 3C shows an example diagram 370 of taking duplicate group addressed frames.

In one or more embodiments, in the following, the link that is used to receive a group addressed frame may be referred to as the GA link. For both options, it is proposed that non-AP MLLE only needs to follow the DTIM of the GA link. Specifically, non-AP MLLE only needs to be awake for the DTIM Beacon of the link that is configured to receive the group addressed frame. Specifically, non-AP MLLE does not need to be awake for the DTIM Beacon of the link that is not configured to receive the group addressed frame.

In one or more embodiments, DTIM group addressed delivery is the default mechanism for single link operation to receive the group addressed frame. It does not make sense to mandate non-AP MLLE to follow DTIM of all the links and do channel switch back and forth. In one or more embodiments, different non-AP MLLE can configure a different link as the GA link. After the multi-link setup between AP MLLE and non-AP MLLE, there can be a default link used as the GA link. The default link can be the link that is used to do the multi-link setup between AP MLLE and non-AP MLLE. Non-AP MLLE shall drop all unfinished fragmented group addressed frame when changing the GA link.

The GA link may have other functionalities. For example, for a non-AP MLLE that configures to receive group addressed frame in link 1, the beacon in link 1 includes a multi-link TIM to indicate the buffered traffic for the non-AP MLLE in other links. This is useful when a TID is not mapped to transmit in the link that is configured to transmit group addressed frame. In one or more embodiments, an element can be designed to indicate a critical update of other BSSs. For example, a bitmap may be used where each bit represents a link, and if the bit is set, then it means that there is a critical update for the indicated link.

In one embodiment, the non-AP MLLE can go DTIM of the indicated link to do a critical update. The non-AP MLLE can request a probe response from the BSS of the indicated link to update the necessary parameters. Non-AP MLLE sends a frame required acknowledgment to notify change of GA link.

In one or more embodiments, in single link operation, AP knows that non-AP STA will wake up for DTIM all the time. In multi-link operation, since non-AP MLLE only needs to follow DTIM of one link. It is useful for AP MLLE to know which links that non-AP MLLE will receive group addressed frame and has mandatory wake up.

Figure 4:
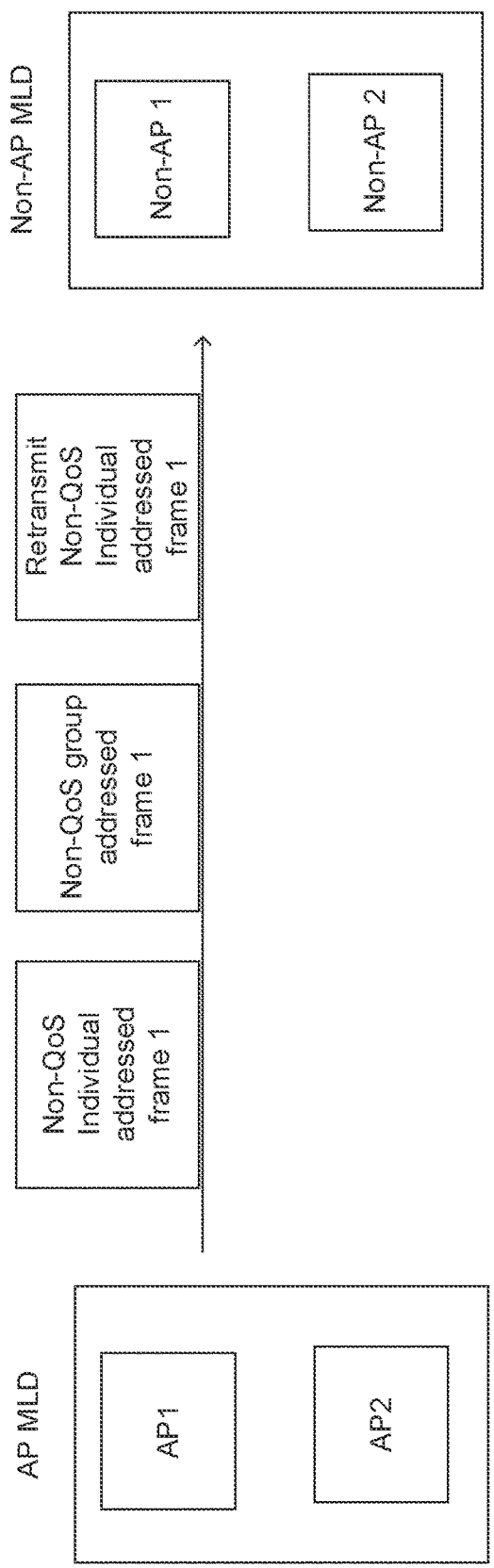
FIG. 4 depicts an illustrative schematic diagram for a disallowed scenario, in accordance with one or more example embodiments of the present disclosure.

FIG. 4 depicts an illustrative schematic diagram 400 for a disallowed scenario, in accordance with one or more example embodiments of the present disclosure.

In one or more embodiments, the complete rule of option 1:

Non-AP MLLE maintains the latest received SN for each TID of QoS group addressed frame. Non-AP MLLE maintains the latest received SN for non-QoS group addressed frame. Non-AP MLLE needs to drop group addressed with SN within range of [latest_received_SN-threshold, latest_received_SN]. The threshold can be 2048. Non-AP MLLE does not update the latest received SN maintained for non-QoS group addressed frame when received non-QoS individual addressed frame. Non-AP MLLE maintains a separate record for each TID of QoS individually addressed frame and does not mix the record with each TID of QoS group addressed frame. AP MLLE needs to make sure that it does not mix non-QoS group addressed delivery in the middle of one non-QoS individual addressed delivery sequence. It is understood that the above descriptions are for purposes of illustration and are not meant to be limiting.

Figure 5A:
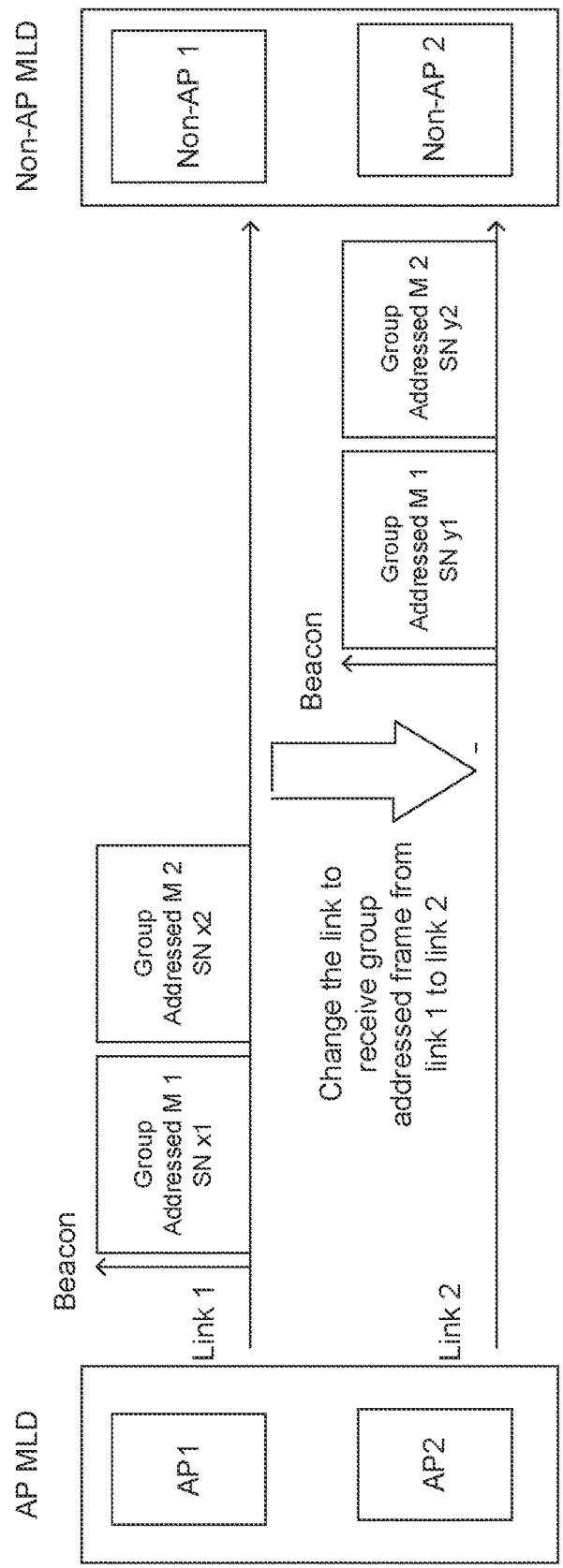
FIGS. 5A-5B depict illustrative schematic diagrams for a 2-way handshake to change a configuration, in accordance with one or more example embodiments of the present disclosure.
Figure 5B:
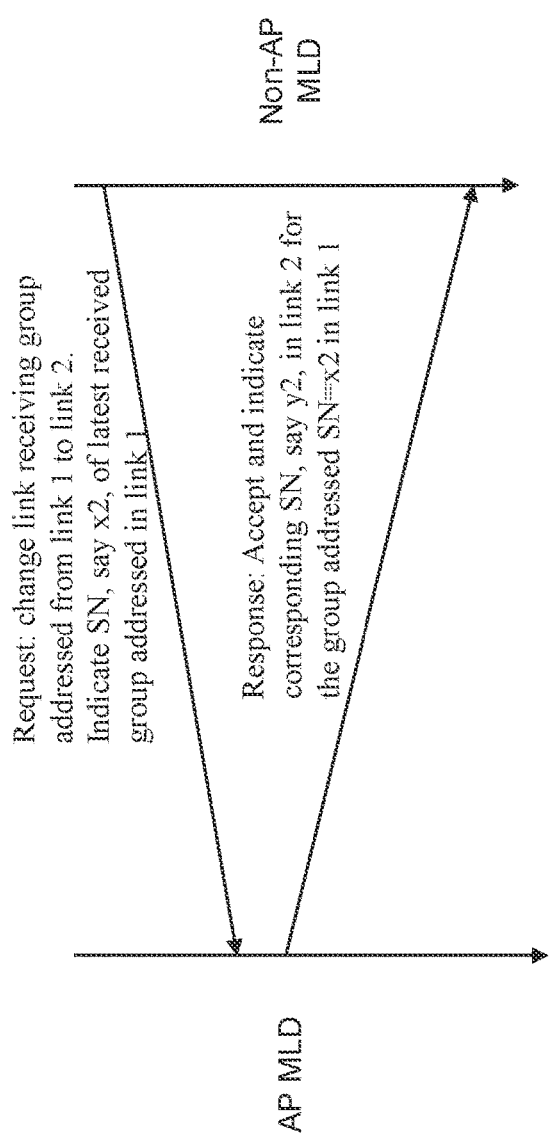

FIGS. 5A-5B depict illustrative schematic diagrams for a 2-way handshake to change a configuration, in accordance with one or more example embodiments of the present disclosure.

In one or more embodiments, for the design for option 2, two examples may be used to illustrate the concept of expanding the notification to handshake, then describe all the relevant details.

Figure 5C:
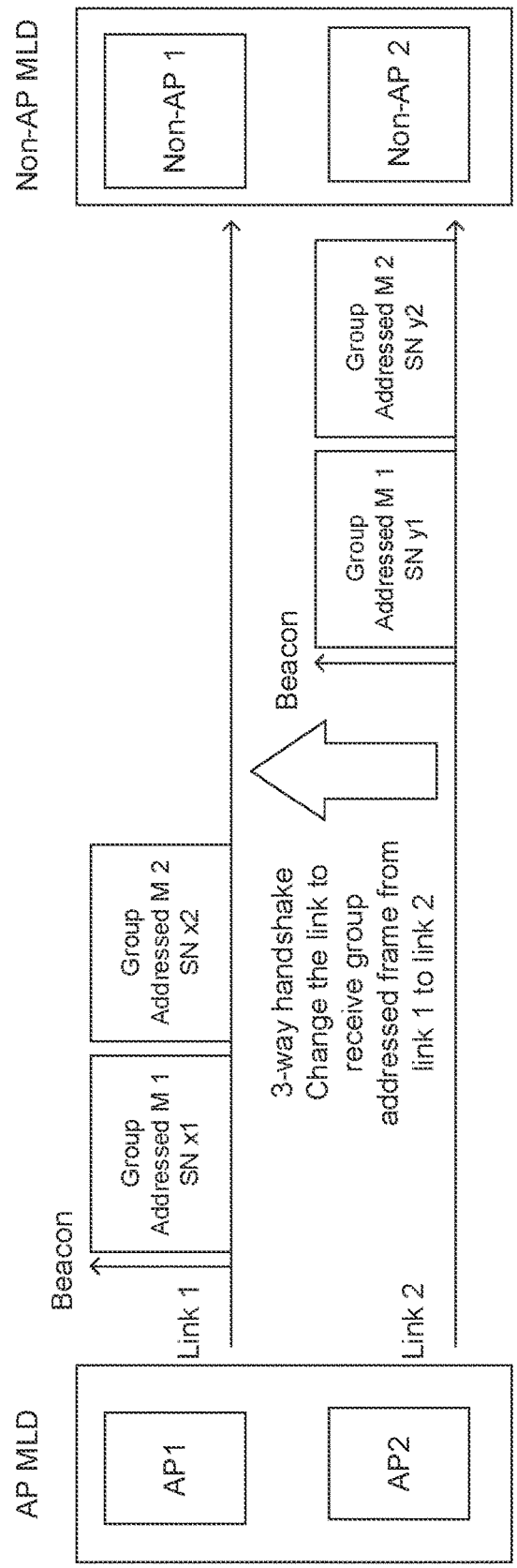
FIGS. 5C-5D depict illustrative schematic diagrams for a 3-way handshake to change a configuration, in accordance with one or more example embodiments of the present disclosure.
Figure 5D:
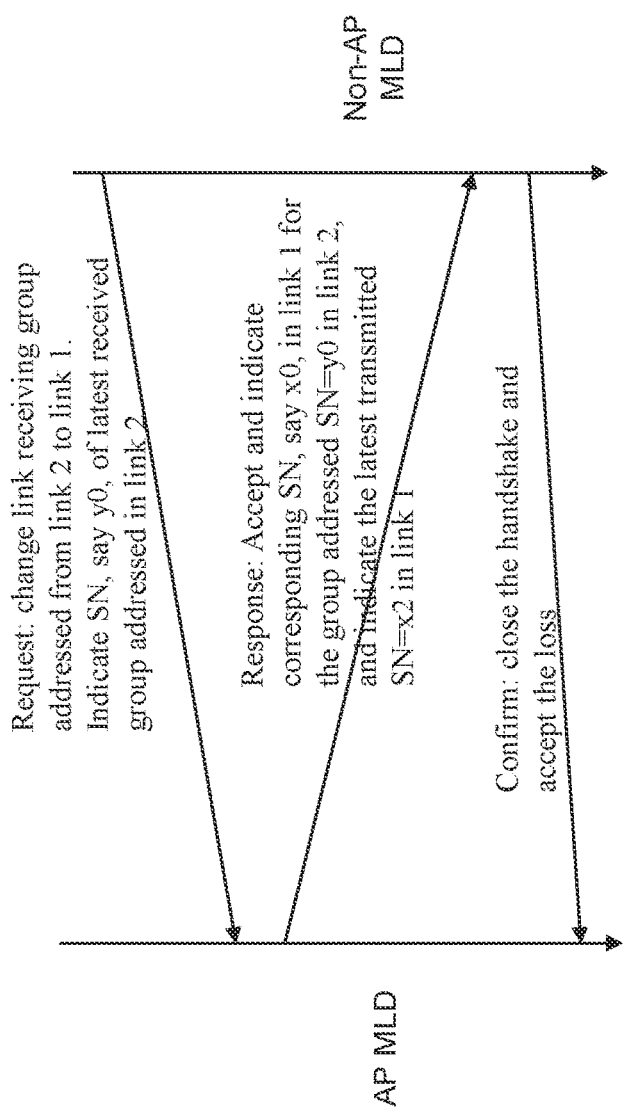

FIGS. 5C-5D depict illustrative schematic diagrams 500, 530, 550, and 570 respectively, for a 3-way handshake to change a configuration, in accordance with one or more example embodiments of the present disclosure.

Some detail associated with FIGS. 5A-5D are provided below.

In one or more embodiments, in Option 2.1, where a 2-way exchange is proposed to change the link to receive group addressed frames.

In one or more embodiments, a request frame is sent by the non-AP MLLE to request the change of GA link. The request frame includes the sequence number for the latest received group addressed frame, say x2, in the current link, say link 1, that is configured to receive the group addressed frame. The request frame indicates the link, say link 2, that the non-AP MLLE wants to request to receive group addressed frame. The indication can be a link ID that indicates link 2.

In one or more embodiments, a response frame is sent by the AP MLLE to accept the change of the GA link. The response frame includes the sequence number for the corresponding group addressed frame, say y2, in link 2 that is configured to receive the group addressed frame. Non-AP MLLE then uses y2 to do duplicate detection in link 2 based on Table 10-6—Receiver cache. Non-AP MLLE can use Indexed by: <Address 2, sequence number, fragment number> in Table 1, where Address 2 is the MAC address of the AP of AP MLLE in link 2.

Non-AP MLLE can use Indexed by: <AP MLLE Address, sequence number, fragment number> in Table 1, and consider entry match if received A2 with MAC address corresponding to any MAC address of AP MLLE.

The non-AP MLLE may drop any fragment version of the group addressed delivery of sequence y2 in link 1. The non-AP MLLE will drop any group addressed delivery of sequence number within [y2 y2-X] in link 1, where X is a threshold. The non-AP MLLE does not change the entry record for dealing with a group addressed duplicate when receiving an individual addressed non-QoS Data frame destined to other STAs in link 1.

In one or more embodiments, in Option 2.2, where a 3-way exchange is proposed to change the link to receive group addressed frames.

In one or more embodiments, a request frame is sent by the non-AP MLLE to request the change of the GA link. The request frame includes the sequence number for the latest received group addressed frame, say y0, in the current link, say link 2, that is configured to receive the group addressed frame. The request frame indicates the link, say link 1, that the non-AP MLLE wants to request to receive group addressed frame. The indication can be a link ID that indicates link 1. The request frame has an indication that a 3-way exchange is used to complete the request sequence. This is useful if we have both a 2-way and 3-way exchange method.

In one or more embodiments, a response frame is sent by the AP MLLE to accept the change of the GA link. The response frame includes the sequence number for the corresponding group addressed frame, say x0, in link 1 that is configured to receive the group addressed frame. The response frame includes the sequence number for the latest transmitted group addressed frame, say x2, in link 1 that is configured to receive the group addressed frame. A confirmation frame is sent by the non-AP MLLE to confirm the change of the GA link to link 1.

In one or more embodiments, non-AP MLLE then uses x0 to do duplicate detection in link 1 based on Table 1—Receiver cache. Non-AP MLLE can use Indexed by: <Address 2, sequence number, fragment number> in Table 1, where Address 2 is the MAC address of the AP of AP MLLE in link 2. Non-AP MLLE can use entry Indexed by: <AP MLLE Address, sequence number, fragment number> in Table 1 and consider entry match if received A2 with MAC address corresponding to any MAC address of AP MLLE. The non-AP MLLE will drop any fragment version of the group addressed delivery of sequence x0 in link 1. The non-AP MLLE will drop any group addressed delivery of sequence number within [x0 x0-X] in link 1, where X is a threshold. The non-AP MLLE does not change the entry record for dealing with group addressed duplicate when receiving an individual addressed non-QoS Data frame destined to other STAs in link 2.

In one or more embodiments, in Option 2.3, where another option may be proposed without the need to have a handshake and just control the transmission pattern of AP MLLE.

In one or more embodiments, an AP MLLE may have the same DTIM interval for all the links. AP MLLE orders the link based on the value of the smallest DTIM. For the following discussion, say link 1 to link k. For all the links with the existence of non-AP MLLE or legacy STAs to receive broadcast addressed frame, say set L for these links. The transmitted broadcast addressed frames in the ith DTIM is the same for all links in set L. For all the links with the existence of non-AP MLLE or legacy STAs to receive multicast group addressed frame in a specific multicast group for non-QoS or QoS of a specific TID, say set L for these links. The transmitted multicast group addressed frames for this multicast group in the ith DTIM is the same for all links in set L. It is understood that the above descriptions are for purposes of illustration and are not meant to be limiting.

Currently, the group addressed data frame is delivered after DTIM as shown below.

When dot11FMSActivated is false, the AP shall transmit all buffered non-GCR-SP (11ak) nonSYNRA group addressed bufferable units (BUs) immediately after every DTIM.

When dot11FMSActivated is true and the AP has established an FMS delivery interval for a multicast stream, the AP shall transmit all non-GCR-SP (11ak) non-SYNRA group addressed BUs belonging to particular FMS stream immediately after the DTIM that has the Current Count field of the FMS Counter field (M101) set to 0 for that particular FMS stream.

If the group addressed data frame cannot be delivered within one Beacon interval, then AP uses More Data bit and AID 0 bit in TIM element to indicate the existence of buffered non-GCR-SP group addressed BUs.

The More Data subfield of each group addressed frame shall be set to indicate the presence of further buffered non-GCR-SP group addressed BUs (11ak) that will be delivered using MPDUs with an RA other than a SYNRA. If the AP is unable (11ak), before the primary or secondary TBTT following the DTIM, to transmit all of the buffered non-GCR-SP group addressed BUs(11ak) that will be delivered using MPDUs with an RA other than a SYNRA, then the AP shall set the bit for AID 0 (zero) in the TIM element to 1 for a single BSSID or set the corresponding group address bit to 1 for multiple BSSIDs, as defined in 9.4.2.5 (TIM element), and when dot11FMSActivated is true, shall set the appropriate bits in the FMS Descriptor element as described in 9.4.2.74 (FMS Descriptor element) to indicate for which non-GCR-SP (11ak)non SYNRA group addresses there are still buffered BUs, until all buffered non-GCR-SP group addressed BUs (11ak) that will be delivered using MPDUs with an RA other than a SYNRA have been transmitted.

STA currently uses DTIM to receive group addressed data frame as shown below. When dot11FMSActivated is false and ReceiveDTIMs is true, the STA shall wake up early enough to be able to receive either every non-space-time block coding (STBC) DTIM or every STBC DTIM sent by the AP of the BSS. When dot11FMSActivated is true and ReceiveDTIMs is true and the STA has been granted by the AP an alternate delivery interval for a multicast stream, the STA shall wake up before the non-STBC DTIM or STBC DTIM having Current Count of FMS Counter field set to 0 for that particular FMS stream. STA shall stay awake until More Data indicates 0 or TIM indicating no more group addressed BUs. An STA that stays awake to receive group addressed BUs shall elect to receive all group addressed non-STBC transmissions or all group addressed STBC transmissions and remain awake until the More Data subfield of the appropriate type (non-STBC or STBC) of group addressed BUs indicates that there are no further buffered group addressed BUs of that type, or until a TIM is received indicating there are no more buffered group addressed BUs of that type.

The current retry rule for MMPDU is described as follows. Based on retransmit procedures, an SRC (Short Retry Counter) is associated with each MSDU or MMPDU. Then a retry continues for each failing frame exchange until the transmission is successful or until the retry limit is reached, whichever occurs first. A QoS STA shall maintain a short retry counter for each MSDU, A-MSDU, or MMPDU that belongs to a TC that requires acknowledgment. After transmitting a frame that requires an immediate acknowledgment, the STA shall perform either of the acknowledgment procedures, as appropriate. The short retry counter for an MSDU or A-MSDU that is not part of a block ack agreement or for an MMPDU shall be incremented every time transmission fails for that MSDU, A-MSDU, or MMPDU, including of an associated RTS.

All retransmission attempts by a non-DMG STA for an MPDU with the Type subfield equal to Data or Management that is not sent under a block ack agreement and that has failed the acknowledgment procedure one or more times shall be made with the Retry subfield set to 1. Retries for failed transmission attempts shall continue until one or more of the following conditions occurs:

The short retry count for the MSDU, A-MSDU, or MMPDU is equal to dot11ShortRetryLimit.

The short drop-eligible retry count for the MSDU, A-MSDU, or MMPDU is equal to dot11ShortDEIRetryLimit.

The long drop-eligible retry count for the MSDU, A-MSDU, or MMPDU is equal to dot11LongDEIRetryLimit.

The unsolicited retry count for the A-MSDU is equal to dot11UnsolicitedRetryLimit.

When any of these limits is reached, retry attempts shall cease, and the MSDU, A-MSDU, or MMPDU shall be discarded.

With the exception of a frame belonging to a TID for which block ack agreement is set up, a QoS STA shall not initiate the transmission of any Management or Data frame to a specific RA while the transmission of another Management or Data frame with the same RA and having been assigned its sequence number from the same sequence counter has not yet completed to the point of success, retry fail, or other MAC discard (e.g., lifetime expiration).

TABLE 1

Receiver Caches

| Receiver cache identifier | Cache name | Applies to | Status | Multiplicity/Cache size | Receiver requirements |
|---|---|---|---|---|---|
| RC1 | NotQoS Data | A STA receiving frames (individually or group addressed) that are not QoS Data, excluding if supported: RC4 RC5 RC6 RC7 RC8 RC10 | Mandatory | Indexed by: <Address 2, sequence number, fragment number>. At least the most recent cache entry per <Address 2>. | RR1 RR2 RR5 |

Based on Table 1—Receiver caches, the receiver records at least the most recent cache entry per <Address 2,> pair in this cache. Each entry is indexed by: <Address 2, sequence number, fragment number>.

Then the receiver STA shall discard the frame if the Retry subfield of the Frame Control field is 1 and it matches an entry in the cache.

Based on the baseline specification, the group addressed data frame shares sequence number space with a group addressed management frame and individual addressed management frame. This is decided in the following Table 2 in the baseline specification.

TABLE 2

Transmitter Sequence Number Spaces

| Sequence number space identifier | Sequence number space | Applies to | Status | Multiplicity | Transmitter requirements |
|---|---|---|---|---|---|
| SNS1 | Baseline | A STA transmitting a frame that is not covered by any of the other sequence number spaces. | Mandatory | Single Instance | TR1 |
| SNS2 | Individually addressed QoS Data | A STA transmitting an individually addressed QoS Data frame, excluding SNS5 | Mandatory | Indexed by <Address 1, TID> | |
| SNS3 | Time Priority Management | A QoS STA transmitting a Time Priority Management frame | Optional | Indexed by <Address 1, TID> | |
| SNS4 | QMF | A QMF STA transmitting a QMF | Mandatory | Indexed by <Address 1, AC> | TR2 |
| SNS5 | QoS (+)Null | A STA transmitting a QoS (+)Null frame | Mandatory | None | TR3 |

In one or more embodiments, a group addressed data system may address the missing group addressed frame.

In one or more embodiments, if an AP MLD does not know which link a non-AP MLD is used to receive group addressed data frame, AP MLD duplicates group addressed data frame destined to any STA affiliated with the non-AP MLD in all the links.

In one or more embodiments, if a non-AP MLD sees an indication of no group addressed buffered data in a link, then the non-AP MLD should change the link to receive group addressed data frame at this time to avoid missing group addressed data frame.

In one or more embodiments, switching link to receive group addressed data frame at this point will avoid missing any group addressed data frame because every group addressed data frame that a non-AP MLD intends to receive is duplicate. The indication can follow the baseline of AID 0 (zero) in the TIM element to 1 for a single BSSID or set the corresponding group address bit to 1 for multiple BSSIDs. The indication can follow the baseline of More Data bit equal to 0 in a group addressed data frame.

In one or more embodiments, another indication in HT Control can be introduced to indicate no group addressed buffered data if More Data bit equal to 0 may mean the termination of current group addressed delivery period.

FIG. 6 depicts an illustrative schematic diagram 600 for group addressed data delivery, in accordance with one or more example embodiments of the present disclosure.

In one or more embodiments, a group addressed data system may address duplicate group addressed data frame independent of shared or not shared SN space:

An AP indicates if other APs in the same MLD have buffered group addressed data for transmission. A new control field variant of an A-Control in HT control is introduced to indicate the status of the buffered group addressed data for other APs in the same MLD. A link ID bitmap with each bit corresponding to the link ID of the AP can be used for the indication. A new element is introduced to indicate the status of the buffered group addressed data for other APs in the same MLD. A bitmap with each bit corresponding to the link ID of the AP can be used for the indication. The element can be carried together with TIM element in a management frame like a Beacon frame. An example is shown below.

Figure 7:
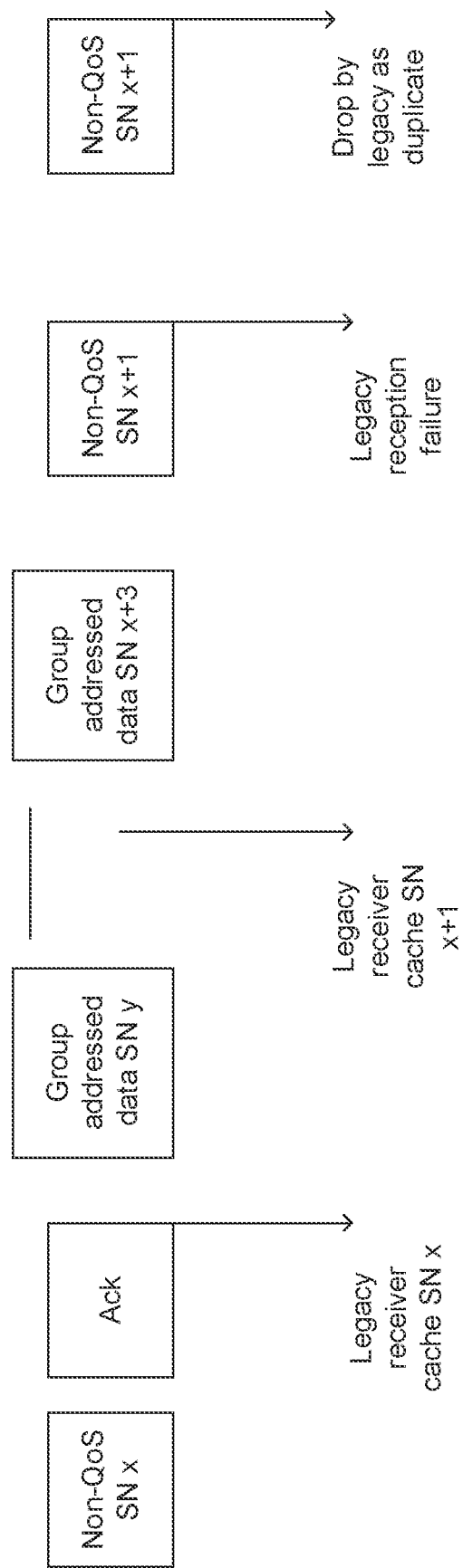
FIG. 7 depicts an illustrative schematic diagram for group addressed data delivery, in accordance with one or more example embodiments of the present disclosure.

FIG. 7 depicts an illustrative schematic diagram 700 for group addressed data delivery, in accordance with one or more example embodiments of the present disclosure.

In one or more embodiments, a group addressed data system would facilitate a shared SN space for group addressed data frame:

Individual addressed management frame for non-EHT STA, group addressed management frame, non-QoS data frame still have independent SN space across links. Note that in the baseline, individual addressed management frame for non-EHT STA, group addressed management frame, non-QoS data frame share the same SN space with group addressed data frame. This proposal then provides something new to the baseline.

Group addressed data frame uses half of the SN space in [0-4095], say range [x,x+2047] (the operation considering modular 4096). The half of the SN space can be [0,2047]. The half of the SN space can be [2048, 4095].

Individual addressed management frame for non-EHT STA, group addressed management frame, non-QoS data frame uses half of the SN space in [0-4095].

The half of the SN space can be [2048, 4095].

The half of the SN space can be [0, 2047].

The half of the SN space can be the SN space that is not used by the group addressed data frame.

The explanation for group addressed data frame using part of the SN space not covered by other categories of frames. It is understood that the above descriptions are for purposes of illustration and are not meant to be limiting.

In one or more embodiments, legacy receivers receive non-QoS SN x and has receiver cache for SN x. Group addressed data uses a separate shared SN space and may transmit SN that includes x+1. A legacy receiver device receives that may update the receiver cache to SN x+1 since the legacy receiver is not aware of the new separation. Later, when non-QoS SN x+1 is transmitted, failed, and retransmitted again with retry bit set. The data will be dropped by legacy STA, even if the data with SN x+1 is not a duplicate. Non-AP MLD keeps a separate receiver record just for duplicate detection of group addressed data frame when switching from one link, say link 1, to another link, say link 2, to receive group addressed data frame. The record can be [x−1023,x], when half SN space is used or [x−2047,x] when full SN space is used:

x is the last received group addressed data frame in link 1

Drops any group addressed data frame in link 2 with SN in the range until a group addressed data frame with SN outside the range is received in link 2

After a group addressed data frame with SN outside the range is received in link 2, the non-AP MLD is not required to do any duplicate detection in link 2.

AP MLD does not transmit the same non-GCR group addressed data frame twice in the same link. It is understood that the above descriptions are for purposes of illustration and are not meant to be limiting.

Figure 8:
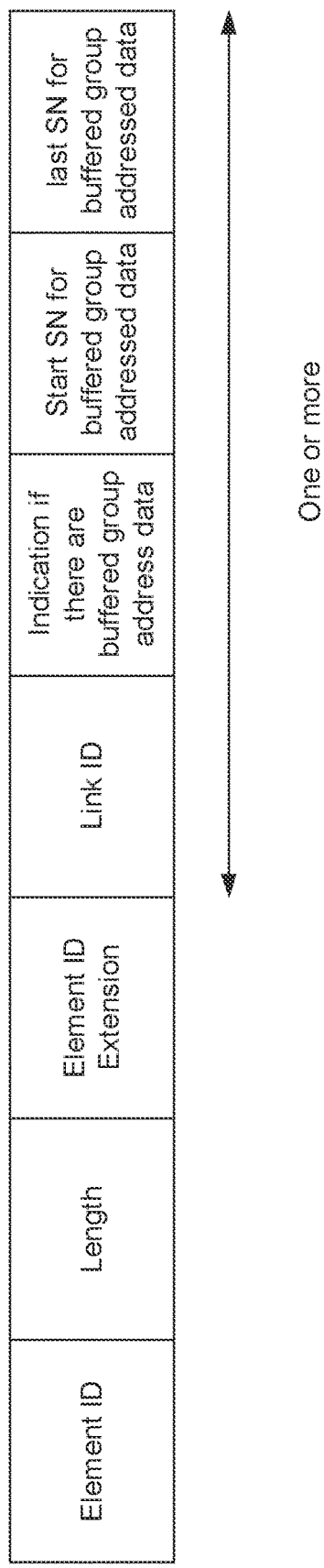
FIG. 8 depicts an illustrative schematic diagram for group addressed data delivery, in accordance with one or more example embodiments of the present disclosure.

FIG. 8 depicts an illustrative schematic diagram 800 for group addressed data delivery, in accordance with one or more example embodiments of the present disclosure.

In one or more embodiments, a group addressed data system would facilitate a proposal of not shared SN space for group addressed data frame:

An element with the following indication is introduced to help duplicate detection.

Whether other links has buffered group addressed BUs.

The current SN range of buffered group addressed BUs in another link.

Start SN for buffered group addressed data in another link.

Last SN for buffered group addressed data in another link.

The information for another links is captured around the time when group addressed data frame finishes delivery in the link that carries the element.

An example of the format of the element is shown below.

The element can be included in a management frame like Beacon frame when TIM element is included in the management frame.

An EHT management frame can be introduced to carry this new element.

The EHT management frame can be transmitted after the last group addressed data frame delivery.

Non-AP MLD keeps a separate receiver record just for duplicate detection of group addressed data frame when switching from one link, say link 1, to another link, say link 2, to receive group addressed data frame.

The record can be [x, y].

x is the Start SN for buffered group addressed data in link 2.

y is the Last SN for buffered group addressed data in link 2.

Drops any group addressed data frame in link 2 with SN in the range until a group addressed data frame with SN outside the range is received in link 2.

After a group addressed data frame with SN outside the range is received in link 2, the non-AP MLD is not required to do any duplicate detection in link 2.

AP MLD does not transmit same non-GCR group addressed data frame twice in the same link. It is understood that the above descriptions are for purposes of illustration and are not meant to be limiting.

Figure 9:
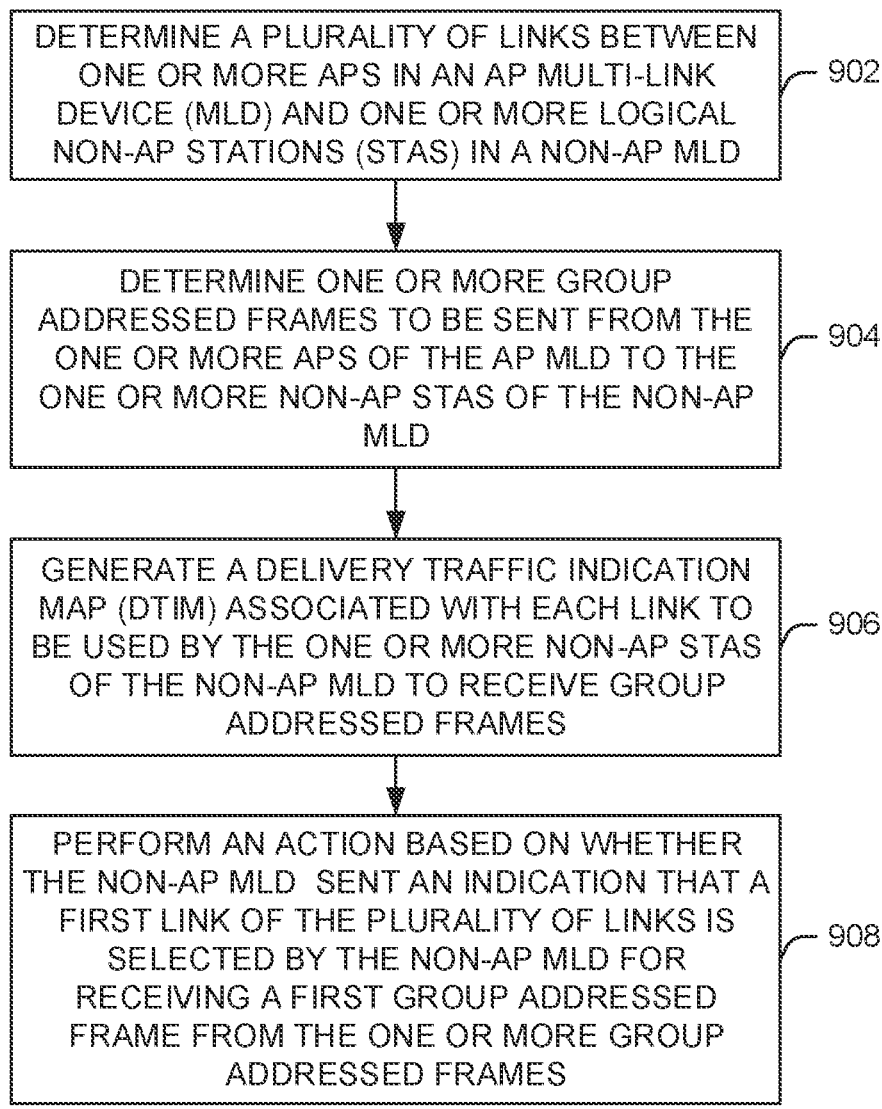
FIG. 9 illustrates a flow diagram of a process for an illustrative group addressed data delivery system, in accordance with one or more example embodiments of the present disclosure.

FIG. 9 illustrates a flow diagram of a process 900 for a group addressed data delivery system, in accordance with one or more example embodiments of the present disclosure.

At block 902, a device (e.g., the user device(s) 120 and/or the AP 102 of FIG. 1) may determine a plurality of links between one or more APs in an AP multi-link device (MLD) and one or more logical non-AP stations (STAs) in a non-AP MLD.

At block 904, the device may determine one or more group addressed frames to be sent from the one or more APs of the AP MLD to the one or more non-AP STAs of the non-AP MLD.

At block 906, the device may generate a delivery traffic indication map (DTIM) associated with each link to be used by the one or more non-AP STAs of the non-AP MLD to receive group addressed frames.

At block 908, the device may perform an action based on whether the non-AP MLD sent an indication that a first link of the plurality of links is selected by the non-AP MLD for receiving a first group addressed frame from the one or more group addressed frames. The device may cause to send an indication in each link to the non-AP MLD, wherein the indication may indicate whether there are buffered group addressed frames to be sent to the non-AP MLD, and wherein the non-AP MLD may not change from the first link to avoid missing the buffered group addressed frames after receiving the indication with buffered group addressed frames. The action comprises using a same beacon interval used on all of the plurality of links to control a delivery of the one or more group addressed frames in each link. The action may comprise using a same beacon interval and a same DTIM interval used on all of the plurality of links to control a delivery of the one or more group addressed frames in each link. The action may comprise selecting a first link to send the first group addressed frame when the non-AP MLD sends the indication. The device may identify a request from the non-AP MLD to change the first link to a second link dedicated by the non-AP MLD to receive group addressed frames. The device may determine a sequence number for a latest received group addressed frame on the first link by the non-AP MLD. The device may cause to send a response frame comprising a sequence number indication to the non-AP MLD, wherein the sequence number indication indicates to the non-AP MLD the sequence number to use for duplicate group addressed frames detection, and wherein the sequence number indication indicates to the non-AP MLD to drop group addressed frames with the sequence number on the first link to avoid duplicate group addressed frames. The device may duplicate the one or more group addressed frames on the plurality of links. The action May comprise that the AP MLD indicates in each link of the plurality of links whether there are buffered group addressed frames in other links, and wherein the action comprises that the AP MLD indicates in each link of the plurality of links whether there are buffered duplicate group addressed frames in other links. The device may cause to send an indication to the non-AP MLD, wherein the indication indicates whether there are buffered group addressed frames or buffered duplicate group addressed frames to be sent on a second link, and wherein the non-AP MLD does not change from the first link to the second link to avoid duplicate group addressed frames.

It is understood that the above descriptions are for purposes of illustration and are not meant to be limiting.

FIG. 10 shows a functional diagram of an exemplary communication station 1000, in accordance with one or more example embodiments of the present disclosure. In one embodiment, FIG. 10 illustrates a functional block diagram of a communication station that may be suitable for use as an AP 102 (FIG. 1) or a user device 120 (FIG. 1) in accordance with some embodiments. The communication station 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1000 may include communications circuitry 1002 and a transceiver 1010 for transmitting and receiving signals to and from other communication stations using one or more antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication station 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication station 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an LCD screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a speaker), a group addressed data delivery device 1119, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1102 for generation and processing of the baseband signals and for controlling operations of the main memory 1104, the storage device 1116, and/or the group addressed data delivery device 1119. The baseband processor may be provided on a single radio card, a single chip, or an integrated circuit (IC).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The group addressed data delivery device 1119 may carry out or perform any of the operations and processes (e.g., process 900) described and shown above.

It is understood that the above are only a subset of what the group addressed data delivery device 1119 may be configured to perform and that other functions included throughout this disclosure may also be performed by the group addressed data delivery device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 12:
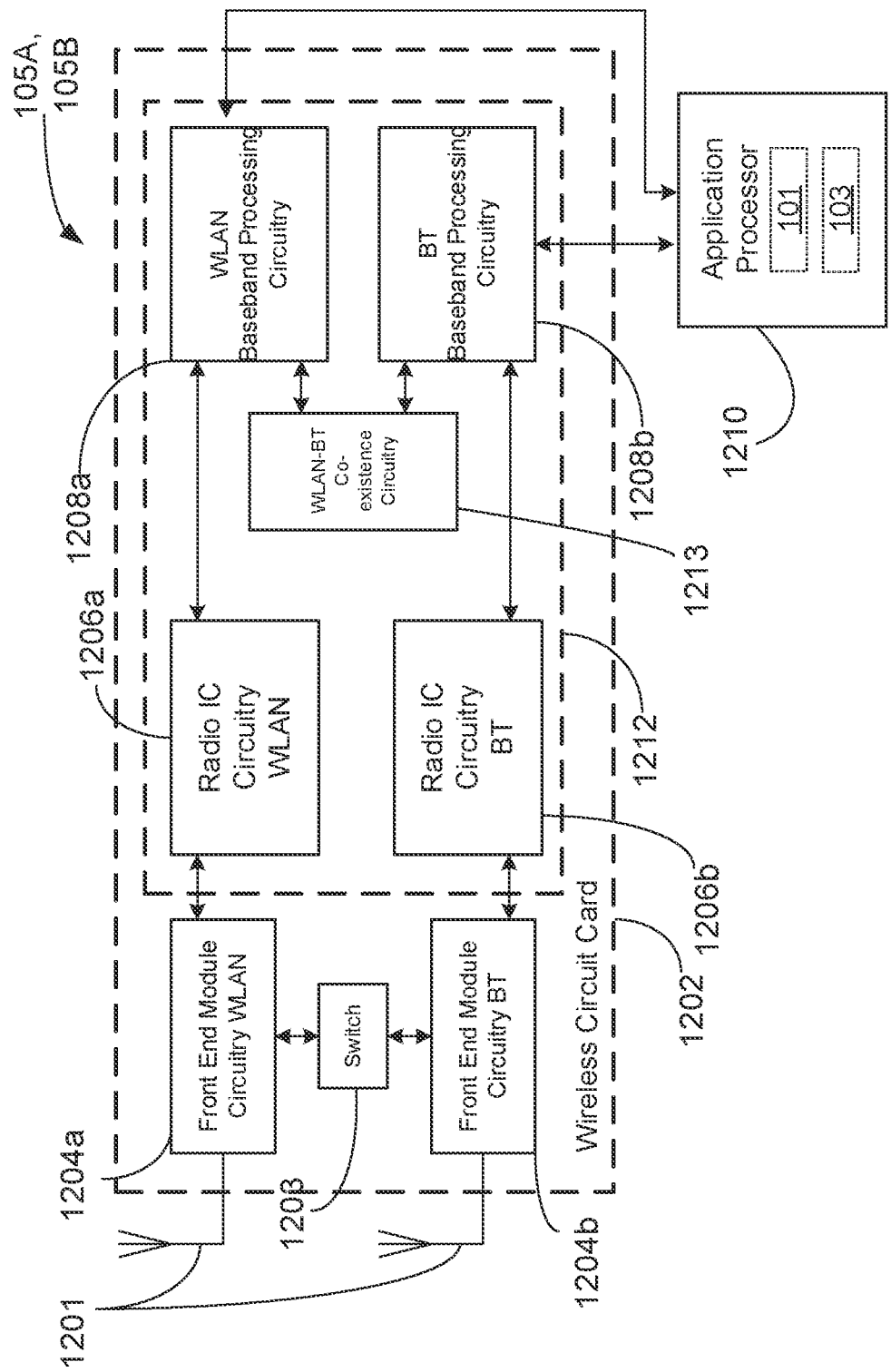
FIG. 12 is a block diagram of a radio architecture, in accordance with one or more example embodiments of the present disclosure.

FIG. 12 is a block diagram of a radio architecture 105A, 105B in accordance with some embodiments that may be implemented in any one of the example AP 100 and/or the example STA 102 of FIG. 1. Radio architecture 105A, 105B may include radio front-end module (FEM) circuitry 1204*a-b*, radio IC circuitry 1206*a-b* and baseband processing circuitry 1208*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1204*a-b* may include a WLAN or Wi-Fi FEM circuitry 1204*a* and a Bluetooth (BT) FEM circuitry 1204*b*. The WLAN FEM circuitry 1204*a* may include a receive signal path comprising circuitry configured to operate on WLAN RF signals received from one or more antennas 1201, to amplify the received signals and to provide the amplified versions of the received signals to the WLAN radio IC circuitry 1206*a* for further processing. The BT FEM circuitry 1204*b* may include a receive signal path which may include circuitry configured to operate on BT RF signals received from one or more antennas 1201, to amplify the received signals and to provide the amplified versions of the received signals to the BT radio IC circuitry 1206*b* for further processing. FEM circuitry 1204*a* may also include a transmit signal path which may include circuitry configured to amplify WLAN signals provided by the radio IC circuitry 1206*a* for wireless transmission by one or more of the antennas 1201. In addition, FEM circuitry 1204*b* may also include a transmit signal path which may include circuitry configured to amplify BT signals provided by the radio IC circuitry 1206*b* for wireless transmission by the one or more antennas. In the embodiment of FIG. 12, although FEM 1204*a* and FEM 1204*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1206*a-b* as shown may include WLAN radio IC circuitry 1206*a* and BT radio IC circuitry 1206*b*. The WLAN radio IC circuitry 1206*a* may include a receive signal path which may include circuitry to down-convert WLAN RF signals received from the FEM circuitry 1204*a* and provide baseband signals to WLAN baseband processing circuitry 1208*a*. BT radio IC circuitry 1206*b* may in turn include a receive signal path which may include circuitry to down-convert BT RF signals received from the FEM circuitry 1204*b* and provide baseband signals to BT baseband processing circuitry 1208*b*. WLAN radio IC circuitry 1206*a* may also include a transmit signal path which may include circuitry to up-convert WLAN baseband signals provided by the WLAN baseband processing circuitry 1208*a* and provide WLAN RF output signals to the FEM circuitry 1204*a* for subsequent wireless transmission by the one or more antennas 1201. BT radio IC circuitry 1206*b* may also include a transmit signal path which may include circuitry to up-convert BT baseband signals provided by the BT baseband processing circuitry 1208*b* and provide BT RF output signals to the FEM circuitry 1204*b* for subsequent wireless transmission by the one or more antennas 1201. In the embodiment of FIG. 12, although radio IC circuitries 1206*a* and 1206*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1208*a-b* may include a WLAN baseband processing circuitry 1208*a* and a BT baseband processing circuitry 1208*b*. The WLAN baseband processing circuitry 1208*a* may include a memory, such as, for example, a set of RAM arrays in a Fast Fourier Transform or Inverse Fast Fourier Transform block (not shown) of the WLAN baseband processing circuitry 1208*a*. Each of the WLAN baseband circuitry 1208*a* and the BT baseband circuitry 1208*b* may further include one or more processors and control logic to process the signals received from the corresponding WLAN or BT receive signal path of the radio IC circuitry 1206*a-b*, and to also generate corresponding WLAN or BT baseband signals for the transmit signal path of the radio IC circuitry 1206*a-b*. Each of the baseband processing circuitries 1208*a* and 1208*b* may further include physical layer (PHY) and medium access control layer (MAC) circuitry, and may further interface with a device for generation and processing of the baseband signals and for controlling operations of the radio IC circuitry 1206*a-b*.

Referring still to FIG. 12, according to the shown embodiment, WLAN-BT coexistence circuitry 1213 may include logic providing an interface between the WLAN baseband circuitry 1208*a* and the BT baseband circuitry 1208*b* to enable use cases requiring WLAN and BT coexistence. In addition, a switch 1203 may be provided between the WLAN FEM circuitry 1204*a* and the BT FEM circuitry 1204*b* to allow switching between the WLAN and BT radios according to application needs. In addition, although the antennas 1201 are depicted as being respectively connected to the WLAN FEM circuitry 1204*a* and the BT FEM circuitry 1204*b*, embodiments include within their scope the sharing of one or more antennas as between the WLAN and BT FEMs, or the provision of more than one antenna connected to each of FEM 1204*a* or 1204*b*.

In some embodiments, the front-end module circuitry 1204*a-b*, the radio IC circuitry 1206*a-b*, and baseband processing circuitry 1208*a-b* may be provided on a single radio card, such as wireless radio card 1202. In some other embodiments, the one or more antennas 1201, the FEM circuitry 1204*a-b* and the radio IC circuitry 1206*a-b* may be provided on a single radio card. In some other embodiments, the radio IC circuitry 1206*a-b* and the baseband processing circuitry 1208*a-b* may be provided on a single chip or integrated circuit (IC), such as IC 1212.

In some embodiments, the wireless radio card 1202 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1208*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 13:
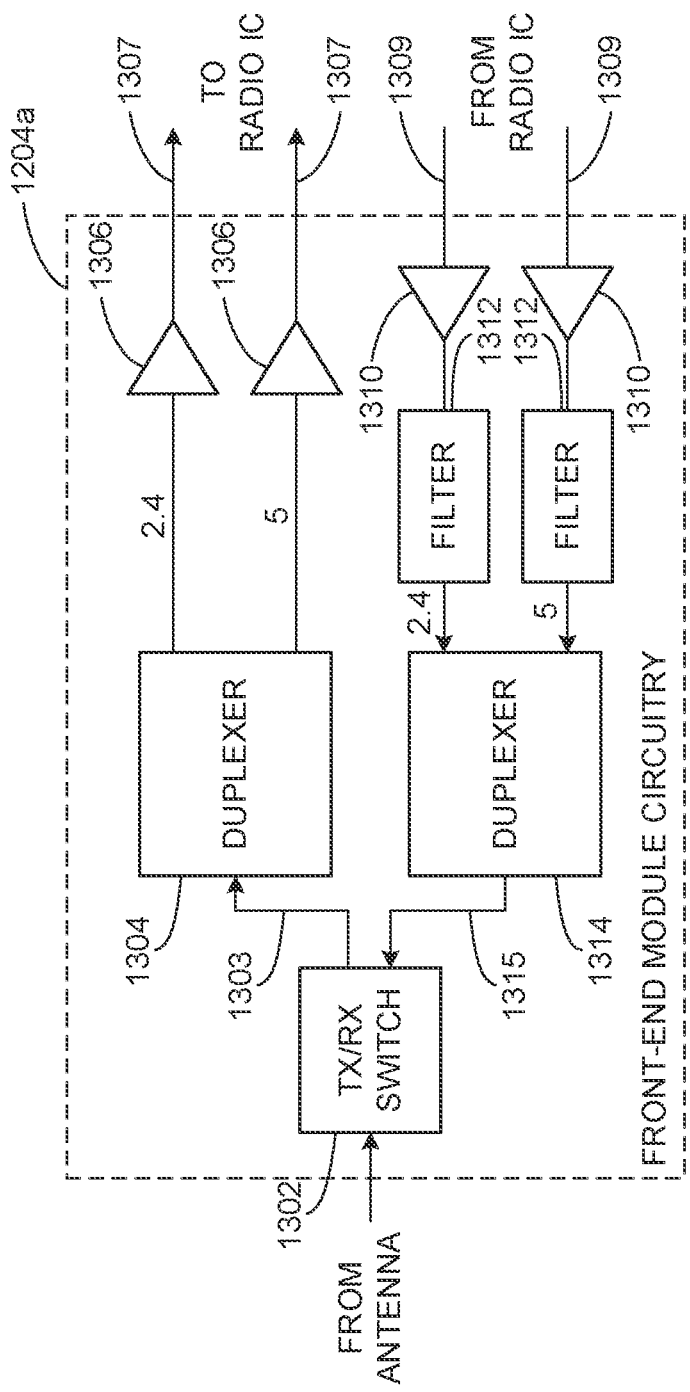
FIG. 13 illustrates an example front-end module circuitry for use in the radio architecture of FIG. 12, in accordance with one or more example embodiments of the present disclosure.

FIG. 13 illustrates WLAN FEM circuitry 1204*a* in accordance with some embodiments. Although the example of FIG. 13 is described in conjunction with the WLAN FEM circuitry 1204*a*, the example of FIG. 13 may be described in conjunction with the example BT FEM circuitry 1204*b* (FIG. 12), although other circuitry configurations may also be suitable.

In some embodiments, the FEM circuitry 1204*a* may include a TX/RX switch 1302 to switch between transmit mode and receive mode operation. The FEM circuitry 1204*a* may include a receive signal path and a transmit signal path. The receive signal path of the FEM circuitry 1204*a* may include a low-noise amplifier (LNA) 1306 to amplify received RF signals 1303 and provide the amplified received RF signals 1307 as an output (e.g., to the radio IC circuitry 1206*a-b* (FIG. 12)). The transmit signal path of the circuitry 1204*a* may include a power amplifier (PA) to amplify input RF signals 1309 (e.g., provided by the radio IC circuitry 1206*a-b*), and one or more filters 1312, such as band-pass filters (BPFs), low-pass filters (LPFs) or other types of filters, to generate RF signals 1315 for subsequent transmission (e.g., by one or more of the antennas 1201 (FIG. 12)) via an example duplexer 1314.

In some dual-mode embodiments for Wi-Fi communication, the FEM circuitry 1204*a* may be configured to operate in either the 2.4 GHz frequency spectrum or the 5 GHz frequency spectrum. In these embodiments, the receive signal path of the FEM circuitry 1204*a* may include a receive signal path duplexer 1304 to separate the signals from each spectrum as well as provide a separate LNA 1306 for each spectrum as shown. In these embodiments, the transmit signal path of the FEM circuitry 1204*a* may also include a power amplifier 1310 and a filter 1312, such as a BPF, an LPF or another type of filter for each frequency spectrum and a transmit signal path duplexer 1304 to provide the signals of one of the different spectrums onto a single transmit path for subsequent transmission by the one or more of the antennas 1201 (FIG. 12). In some embodiments, BT communications may utilize the 2.4 GHz signal paths and may utilize the same FEM circuitry 1204*a* as the one used for WLAN communications.

Figure 14:
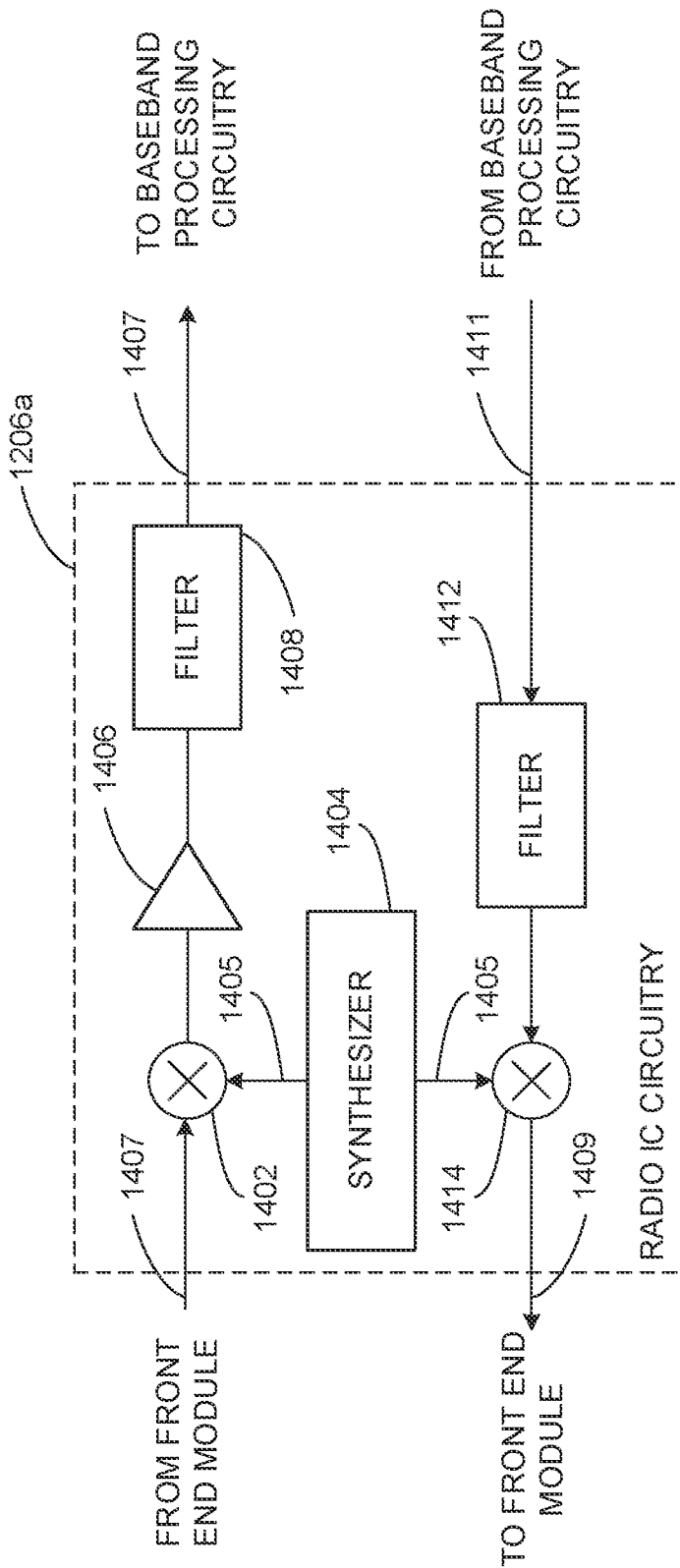
FIG. 14 illustrates an example radio IC circuitry for use in the radio architecture of FIG. 12, in accordance with one or more example embodiments of the present disclosure.

FIG. 14 illustrates radio IC circuitry 1206*a* in accordance with some embodiments. The radio IC circuitry 1206*a* is one example of circuitry that may be suitable for use as the WLAN or BT radio IC circuitry 1206*a*/1206*b* (FIG. 12), although other circuitry configurations may also be suitable. Alternatively, the example of FIG. 14 may be described in conjunction with the example BT radio IC circuitry 1206*b*.

In some embodiments, the radio IC circuitry 1206*a* may include a receive signal path and a transmit signal path. The receive signal path of the radio IC circuitry 1206*a* may include at least mixer circuitry 1402, such as, for example, down-conversion mixer circuitry, amplifier circuitry 1406 and filter circuitry 1408. The transmit signal path of the radio IC circuitry 1206*a* may include at least filter circuitry 1412 and mixer circuitry 1414, such as, for example, upconversion mixer circuitry. Radio IC circuitry 1206*a* may also include synthesizer circuitry 1404 for synthesizing a frequency 1405 for use by the mixer circuitry 1402 and the mixer circuitry 1414. The mixer circuitry 1402 and/or 1414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, embodiments where each of the depicted circuitries may include more than one component. For instance, mixer circuitry 1414 may each include one or more mixers, and filter circuitries 1408 and/or 1412 may each include one or more filters, such as one or more BPFs and/or LPFs according to application needs. For example, when mixer circuitries are of the direct-conversion type, they may each include two or more mixers.

In some embodiments, mixer circuitry 1402 may be configured to down-convert RF signals 1307 received from the FEM circuitry 1204a-b (FIG. 12) based on the synthesized frequency 1405 provided by synthesizer circuitry 1404. The amplifier circuitry 1406 may be configured to amplify the down-converted signals and the filter circuitry 1408 may include an LPF configured to remove unwanted signals from the down-converted signals to generate output baseband signals 1407. Output baseband signals 1407 may be provided to the baseband processing circuitry 1208a-b (FIG. 12) for further processing. In some embodiments, the output baseband signals 1407 may be zero-frequency baseband signals, although this is not a requirement. In some embodiments, mixer circuitry 1402 may comprise passive mixers, although the scope of the embodiments is not limited in this respect.

In some embodiments, the mixer circuitry 1414 may be configured to up-convert input baseband signals 1411 based on the synthesized frequency 1405 provided by the synthesizer circuitry 1404 to generate RF output signals 1309 for the FEM circuitry 1204a-b. The baseband signals 1411 may be provided by the baseband processing circuitry 1208a-b and may be filtered by filter circuitry 1412. The filter circuitry 1412 may include an LPF or a BPF, although the scope of the embodiments is not limited in this respect.

In some embodiments, the mixer circuitry 1402 and the mixer circuitry 1414 may each include two or more mixers and may be arranged for quadrature down-conversion and/or upconversion respectively with the help of synthesizer 1404. In some embodiments, the mixer circuitry 1402 and the mixer circuitry 1414 may each include two or more mixers each configured for image rejection (e.g., Hartley image rejection). In some embodiments, the mixer circuitry 1402 and the mixer circuitry 1414 may be arranged for direct down-conversion and/or direct upconversion, respectively. In some embodiments, the mixer circuitry 1402 and the mixer circuitry 1414 may be configured for super-heterodyne operation, although this is not a requirement.

Mixer circuitry 1402 may comprise, according to one embodiment: quadrature passive mixers (e.g., for the in-phase (I) and quadrature phase (Q) paths). In such an embodiment, RF input signal 1307 from FIG. 14 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1405 of synthesizer 1404 (FIG. 14). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1307 (FIG. 13) may comprise a balanced signal, although the scope of the embodiments is not limited in this respect. The I and Q baseband output signals may be provided to low-noise amplifier, such as amplifier circuitry 1406 (FIG. 14) or to filter circuitry 1408 (FIG. 14).

In some embodiments, the output baseband signals 1407 and the input baseband signals 1411 may be analog baseband signals, although the scope of the embodiments is not limited in this respect. In some alternate embodiments, the output baseband signals 1407 and the input baseband signals 1411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1404 may be a fractional-N synthesizer or a fractional N/N+1 synthesizer, although the scope of the embodiments is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some embodiments, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1404 may be provided by a voltage controlled oscillator (VCO), although that is not a requirement. A divider control input may further be provided by either the baseband processing circuitry 1208a-b (FIG. 12) depending on the desired output frequency 1405. In some embodiments, a divider control input (e.g., N) may be determined from a look-up table (e.g., within a Wi-Fi card) based on a channel number and a channel center frequency as determined or indicated by the example application processor 1210. The application processor 1210 may include, or otherwise be connected to, one of the example secure signal converter 101 or the example received signal converter 103 (e.g., depending on which device the example radio architecture is implemented in).

In some embodiments, synthesizer circuitry 1404 may be configured to generate a carrier frequency as the output frequency 1405, while in other embodiments, the output frequency 1405 may be a fraction of the carrier frequency (e.g., one-half the carrier frequency, one-third the carrier frequency). In some embodiments, the output frequency 1405 may be a LO frequency (fLO).

Figure 15:
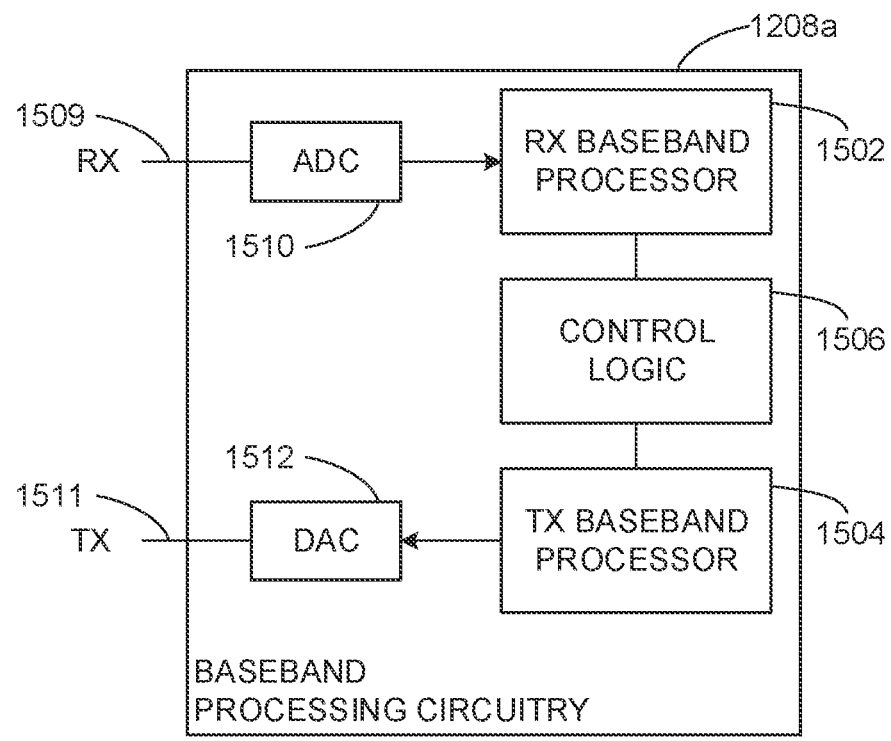
FIG. 15 illustrates an example baseband processing circuitry for use in the radio architecture of FIG. 12, in accordance with one or more example embodiments of the present disclosure.

FIG. 15 illustrates a functional block diagram of baseband processing circuitry 1208a in accordance with some embodiments. The baseband processing circuitry 1208a is one example of circuitry that may be suitable for use as the baseband processing circuitry 1208a (FIG. 12), although other circuitry configurations may also be suitable. Alternatively, the example of FIG. 14 may be used to implement the example BT baseband processing circuitry 1208b of FIG. 12.

The baseband processing circuitry 1208a may include a receive baseband processor (RX BBP) 1502 for processing receive baseband signals 1409 provided by the radio IC circuitry 1206a-b (FIG. 12) and a transmit baseband processor (TX BBP) 1504 for generating transmit baseband signals 1411 for the radio IC circuitry 1206a-b. The baseband processing circuitry 1208a may also include control logic 1506 for coordinating the operations of the baseband processing circuitry 1208a.

In some embodiments (e.g., when analog baseband signals are exchanged between the baseband processing circuitry 1208a-b and the radio IC circuitry 1206a-b), the baseband processing circuitry 1208a may include ADC 1510 to convert analog baseband signals 1509 received from the radio IC circuitry 1206a-b to digital baseband signals for processing by the RX BBP 1502. In these embodiments, the baseband processing circuitry 1208a may also include DAC 1512 to convert digital baseband signals from the TX BBP 1504 to analog baseband signals 1511.

In some embodiments that communicate OFDM signals or OFDMA signals, such as through baseband processor 1208a, the transmit baseband processor 1504 may be configured to generate OFDM or OFDMA signals as appropriate for transmission by performing an inverse fast Fourier transform (IFFT). The receive baseband processor 1502 may be configured to process received OFDM signals or OFDMA signals by performing an FFT. In some embodiments, the receive baseband processor 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some embodiments, the antennas 1201 (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1201 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine a plurality of links between one or more APs in an AP multi-link device (MLD) and one or more logical non-AP stations (STAs) in a non-AP MLD; determine one or more group addressed frames to be sent from the one or more APs of the AP MLD to the one or more non-AP STAs of the non-AP MLD; generate a delivery traffic indication map (DTIM) associated with each link to be used by the one or more non-AP STAs of the non-AP MLD to receive group addressed frames; and perform an action based on whether the non-AP MLD sent an indication that a first link of the plurality of links may be selected by the non-AP MLD for receiving a first group addressed frame from the one or more group addressed frames.

Example 2 may include the device of example 1 and/or some other example herein, wherein the processing circuitry may be further configured to: cause to send an indication in each link to the non-AP MLD, wherein the indication indicates whether there are buffered group addressed frames to be sent to the non-AP MLD, and wherein the non-AP MLD does not change from the first link to avoid missing the buffered group addressed frames after receiving the indication with buffered group addressed frames.

Example 3 may include the device of example 1 and/or some other example herein, wherein the action comprises using a same beacon interval used on all of the plurality of links to control a delivery of the one or more group addressed frames in each link.

Example 4 may include the device of example 1 and/or some other example herein, wherein the action comprises using a same beacon interval and a same DTIM interval used on all of the plurality of links to control a delivery of the one or more group addressed frames in each link.

Example 5 may include the device of example 1 and/or some other example herein, wherein the action comprises selecting a first link to send the first group addressed frame when the non-AP MLD sends the indication.

Example 6 may include the device of example 1 and/or some other example herein, wherein the processing circuitry may be further configured to identify a request from the non-AP MLD to change the first link to a second link dedicated by the non-AP MLD to receive group addressed frames.

Example 7 may include the device of example 1 and/or some other example herein, wherein the processing circuitry may be further configured to: determine a sequence number for a latest received group addressed frame on the first link by the non-AP MLD; cause to send a response frame comprising a sequence number indication to the non-AP MLD, wherein the sequence number indication indicates to the non-AP MLD the sequence number to use for duplicate group addressed frames detection, and wherein the sequence number indication indicates to the non-AP MLD to drop group addressed frames with the sequence number on the first link to avoid duplicate group addressed frames.

Example 8 may include the device of example 1 and/or some other example herein, duplicate the one or more group addressed frames on the plurality of links.

Example 9 may include the device of example 7 and/or some other example herein, wherein the action comprises that the AP MLD indicates in each link of the plurality of links whether there are buffered group addressed frames in other links, and wherein the action comprises that the AP MLD indicates in each link of the plurality of links whether there are buffered duplicate group addressed frames in other links.

Example 10 may include the device of example 9 and/or some other example herein, wherein the processing circuitry may be further configured to: cause to send an indication to the non-AP MLD, wherein the indication indicates whether there are buffered group addressed frames or buffered duplicate group addressed frames to be sent on a second link, and wherein the non-AP MLD does not change from the first link to the second link to avoid duplicate group addressed frames.

Example 11 may include a non-transitory computer-readable medium storing computer-executable instructions which when executed by one or more processors result in performing operations comprising: determining a plurality of links between one or more APs in an AP multi-link device (MLD) and one or more logical non-AP stations (STAs) in a non-AP MLD; determining one or more group addressed frames to be sent from the one or more APs of the AP MLD to the one or more non-AP STAs of the non-AP MLD; generating a delivery traffic indication map (DTIM) associated with each link to be used by the one or more non-AP STAs of the non-AP MLD to receive group addressed frames; and performing an action based on whether the non-AP MLD sent an indication that a first link of the plurality of links may be selected by the non-AP MLD for receiving a first group addressed frame from the one or more group addressed frames.

Example 12 may include the non-transitory computer-readable medium of example 11 and/or some other example herein, wherein the operations further comprise: causing to send an indication in each link to the non-AP MLD, wherein the indication indicates whether there are buffered group addressed frames to be sent to the non-AP MLD, and wherein the non-AP MLD does not change from the first link to avoid missing the buffered group addressed frames after receiving the indication with buffered group addressed frames.

Example 13 may include the non-transitory computer-readable medium of example 11 and/or some other example herein, wherein the action comprises using a same beacon interval used on all of the plurality of links to control a delivery of the one or more group addressed frames in each link.

Example 14 may include the non-transitory computer-readable medium of example 11 and/or some other example herein, wherein the action comprises using a same beacon interval and a same DTIM interval used on all of the plurality of links to control a delivery of the one or more group addressed frames in each link.

Example 15 may include the non-transitory computer-readable medium of example 11 and/or some other example herein, wherein the action comprises selecting a first link to send the first group addressed frame when the non-AP MLD sends the indication.

Example 16 may include the non-transitory computer-readable medium of example 11 and/or some other example herein, wherein the operations further comprise identifying a request from the non-AP MLD to change the first link to a second link dedicated by the non-AP MLD to receive group addressed frames.

Example 17 may include the non-transitory computer-readable medium of example 11 and/or some other example herein, wherein the operations further comprise: determining a sequence number for a latest received group addressed frame on the first link by the non-AP MLD; causing to send a response frame comprising a sequence number indication to the non-AP MLD, wherein the sequence number indication indicates to the non-AP MLD the sequence number to use for duplicate group addressed frames detection, and wherein the sequence number indication indicates to the non-AP MLD to drop group addressed frames with the sequence number on the first link to avoid duplicate group addressed frames.

Example 18 may include the non-transitory computer-readable medium of example 11 and/or some other example herein, duplicate the one or more group addressed frames on the plurality of links.

Example 19 may include the non-transitory computer-readable medium of example 18 and/or some other example herein, wherein the action comprises that the AP MLD indicates in each link of the plurality of links whether there are buffered group addressed frames in other links, and wherein the action comprises that the AP MLD indicates in each link of the plurality of links whether there are buffered duplicate group addressed frames in other links.

Example 20 may include the non-transitory computer-readable medium of example 19 and/or some other example herein, wherein the operations further comprise: causing to send an indication to the non-AP MLD, wherein the indication indicates whether there are buffered group addressed frames or buffered duplicate group addressed frames to be sent on a second link, and wherein the non-AP MLD does not change from the first link to the second link to avoid duplicate group addressed frames.

Example 21 may include a method comprising: determining, by one or more processors, a plurality of links between one or more APs in an AP multi-link device (MLD) and one or more logical non-AP stations (STAs) in a non-AP MLD; determining one or more group addressed frames to be sent from the one or more APs of the AP MLD to the one or more non-AP STAs of the non-AP MLD; generating a delivery traffic indication map (DTIM) associated with each link to be used by the one or more non-AP STAs of the non-AP MLD to receive group addressed frames; and performing an action based on whether the non-AP MLD sent an indication that a first link of the plurality of links may be selected by the non-AP MLD for receiving a first group addressed frame from the one or more group addressed frames.

Example 22 may include the method of example 21 and/or some other example herein, further comprising: causing to send an indication in each link to the non-AP MLD, wherein the indication indicates whether there are buffered group addressed frames to be sent to the non-AP MLD, and wherein the non-AP MLD does not change from the first link to avoid missing the buffered group addressed frames after receiving the indication with buffered group addressed frames.

Example 23 may include the method of example 21 and/or some other example herein, wherein the action comprises using a same beacon interval used on all of the plurality of links to control a delivery of the one or more group addressed frames in each link.

Example 24 may include the method of example 21 and/or some other example herein, wherein the action comprises using a same beacon interval and a same DTIM interval used on all of the plurality of links to control a delivery of the one or more group addressed frames in each link.

Example 25 may include the method of example 21 and/or some other example herein, wherein the action comprises selecting a first link to send the first group addressed frame when the non-AP MLD sends the indication.

Example 26 may include the method of example 21 and/or some other example herein, further comprising identifying a request from the non-AP MLD to change the first link to a second link dedicated by the non-AP MLD to receive group addressed frames.

Example 27 may include the method of example 1 and/or some other example herein, further comprising: determining a sequence number for a latest received group addressed frame on the first link by the non-AP MLD; causing to send a response frame comprising a sequence number indication to the non-AP MLD, wherein the sequence number indication indicates to the non-AP MLD the sequence number to use for duplicate group addressed frames detection, and wherein the sequence number indication indicates to the non-AP MLD to drop group addressed frames with the sequence number on the first link to avoid duplicate group addressed frames.

Example 28 may include the method of example 27 and/or some other example herein, duplicate the one or more group addressed frames on the plurality of links.

Example 29 may include the method of example 28 and/or some other example herein, wherein the action comprises that the AP MLD indicates in each link of the plurality of links whether there are buffered group addressed frames in other links, and wherein the action comprises that the AP MLD indicates in each link of the plurality of links whether there are buffered duplicate group addressed frames in other links.

Example 30 may include the method of example 29 and/or some other example herein, further comprising: causing to send an indication to the non-AP MLD, wherein the indication indicates whether there are buffered group addressed frames or buffered duplicate group addressed frames to be sent on a second link, and wherein the non-AP MLD does not change from the first link to the second link to avoid duplicate group addressed frames.

Example 31 may include an apparatus comprising means for: determining a plurality of links between one or more APs in an AP multi-link device (MLD) and one or more logical non-AP stations (STAs) in a non-AP MLD; determining one or more group addressed frames to be sent from the one or more APs of the AP MLD to the one or more non-AP STAs of the non-AP MLD; generating a delivery traffic indication map (DTIM) associated with each link to be used by the one or more non-AP STAs of the non-AP MLD to receive group addressed frames; and performing an action based on whether the non-AP MLD sent an indication that a first link of the plurality of links may be selected by the non-AP MLD for receiving a first group addressed frame from the one or more group addressed frames.

Example 32 may include the apparatus of example 31 and/or some other example herein, further comprising: causing to send an indication in each link to the non-AP MLD, wherein the indication indicates whether there are buffered group addressed frames to be sent to the non-AP MLD, and wherein the non-AP MLD does not change from the first link to avoid missing the buffered group addressed frames after receiving the indication with buffered group addressed frames.

Example 33 may include the apparatus of example 31 and/or some other example herein, wherein the action comprises using a same beacon interval used on all of the plurality of links to control a delivery of the one or more group addressed frames in each link.

Example 34 may include the apparatus of example 31 and/or some other example herein, wherein the action comprises using a same beacon interval and a same DTIM interval used on all of the plurality of links to control a delivery of the one or more group addressed frames in each link.

Example 35 may include the apparatus of example 31 and/or some other example herein, wherein the action comprises selecting a first link to send the first group addressed frame when the non-AP MLD sends the indication.

Example 36 may include the apparatus of example 31 and/or some other example herein, further comprising identifying a request from the non-AP MLD to change the first link to a second link dedicated by the non-AP MLD to receive group addressed frames.

Example 37 may include the apparatus of example 31 and/or some other example herein, further comprising: determining a sequence number for a latest received group addressed frame on the first link by the non-AP MLD; causing to send a response frame comprising a sequence number indication to the non-AP MLD, wherein the sequence number indication indicates to the non-AP MLD the sequence number to use for duplicate group addressed frames detection, and wherein the sequence number indication indicates to the non-AP MLD to drop group addressed frames with the sequence number on the first link to avoid duplicate group addressed frames.

Example 38 may include the apparatus of example 31 and/or some other example herein, duplicate the one or more group addressed frames on the plurality of links.

Example 39 may include the apparatus of example 38 and/or some other example herein, wherein the action comprises that the AP MLD indicates in each link of the plurality of links whether there are buffered group addressed frames in other links, and wherein the action comprises that the AP MLD indicates in each link of the plurality of links whether there are buffered duplicate group addressed frames in other links.

Example 40 may include the apparatus of example 39 and/or some other example herein, further comprising: causing to send an indication to the non-AP MLD, wherein the indication indicates whether there are buffered group addressed frames or buffered duplicate group addressed frames to be sent on a second link, and wherein the non-AP MLD does not change from the first link to the second link to avoid duplicate group addressed frames.

Example 41 may include one or more non-transitory computer-readable media comprising instructions to cause an electronic device, upon execution of the instructions by one or more processors of the electronic device, to perform one or more elements of a method described in or related to any of examples 1-40, or any other method or process described herein.

Example 42 may include an apparatus comprising logic, modules, and/or circuitry to perform one or more elements of a method described in or related to any of examples 1-40, or any other method or process described herein.

Example 43 may include a method, technique, or process as described in or related to any of examples 1-40, or portions or parts thereof.

Example 44 may include an apparatus comprising: one or more processors and one or more computer readable media comprising instructions that, when executed by the one or more processors, cause the one or more processors to perform the method, techniques, or process as described in or related to any of examples 1-40, or portions thereof.

Example 45 may include a method of communicating in a wireless network as shown and described herein.

Example 46 may include a system for providing wireless communication as shown and described herein.

Example 47 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus, the apparatus comprising processing circuitry coupled to storage, the processing circuitry configured to:
    determine a plurality of links between one or more access points (APs) in an AP multi-link device (MLD) and one or more logical non-AP stations (STAs) in a non-AP MLD;
    determine one or more group addressed frames to be sent from the one or more APs of the AP MLD to the one or more non-AP STAs of the non-AP MLD;
    generate a Beacon frame containing a Multi-Link Traffic Indication Map (TIM) element, wherein the TIM element includes a control field variant and a link ID bitmap, each bit of the link ID bitmap corresponding to a link ID of the AP MLD, to indicate a status of buffered group addressed data for the one or more APs in the AP MLD;
    buffer a Buffered Unit (BU) associated with a Traffic Identifier (TID) when the TID is not mapped to any active link for the non-AP MLD;
    update a bit in the link ID bitmap of the TIM element to reflect a status of the BU, where the bit corresponds to an Access Identifier (AID) of the non-AP MLD; and
    cause to send the beacon frame to the one or more non-AP STAs of the non-AP MLD.

2. The apparatus of claim 1, wherein the processing circuitry is further configured to utilize the TIM element within the Beacon frame to indicate buffered traffic for the non-AP MLD in other links.

3. The apparatus of claim 1, wherein the processing circuitry is further configured to utilize a More Data bit in the TIM element within the Beacon frame to indicate an existence of buffered group addressed Buffer Units (BUs).

4. The apparatus of claim 1, wherein the processing circuitry is further configured to maintain the latest received Sequence Number (SN) for non-Quality of Service (QoS) group addressed frame.

5. The apparatus of claim 1, wherein the processing circuitry is further configured to maintain a separate record for each Traffic Identifier (TID) of QoS individually addressed frame and not mix the record with each TID of QoS group addressed frame.

6. The apparatus of claim 1, wherein the Beacon frame containing the TIM and the link ID bitmap is transmitted at periodic intervals.

7. The apparatus of claim 1, wherein the processing circuitry is further configured to buffer a frame intended for a non-AP Station (STA) when all STAs affiliated with the non-AP MLD are in power save mode.

8. The apparatus of claim 1, wherein the buffered BU with a TID is intended for receipt by a non-AP STA affiliated with a non-AP MLD.

9. A non-transitory computer-readable medium storing computer-executable instructions which when executed by one or more processors result in performing operations comprising:
- determining a plurality of links between one or more access points (APs) in an AP multi-link device (MLD) and one or more logical non-AP stations (STAs) in a non-AP MLD;
- determining one or more group addressed frames to be sent from the one or more APs of the AP MLD to the one or more non-AP STAs of the non-AP MLD;
- generating a Beacon frame containing a Multi-Link Traffic Indication Map (TIM) element, wherein the TIM element includes a control field variant and a link ID bitmap, each bit of the link ID bitmap corresponding to a link ID of the AP MLD, to indicate a status of buffered group addressed data for the one or more APs in the AP MLD;
- buffering a Buffered Unit (BU) associated with a Traffic Identifier (TID) when the TID is not mapped to any active link for the non-AP MLD;
- updating a bit in the link ID bitmap of the TIM element to reflect a status of the BU, where the bit corresponds to an Access Identifier (AID) of the non-AP MLD; and
- causing to send the beacon frame to the one or more non-AP STAs of the non-AP MLD.

10. The non-transitory computer-readable medium of claim 9, wherein the operations further comprise utilizing the TIM element within the Beacon frame to indicate buffered traffic for the non-AP MLD in other links.

11. The non-transitory computer-readable medium of claim 9, wherein the operations further comprise utilizing a More Data bit in the TIM element within the Beacon frame to indicate an existence of buffered group addressed Buffer Units (BUs).

12. The non-transitory computer-readable medium of claim 9, wherein the operations further comprise maintaining the latest received Sequence Number (SN) for non-Quality of Service (QOS) group addressed frame.

13. The non-transitory computer-readable medium of claim 9, wherein the operations further comprise maintaining a separate record for each Traffic Identifier (TID) of QOS individually addressed frame and not mix the record with each TID of QoS group addressed frame.

14. The non-transitory computer-readable medium of claim 9, wherein the Beacon frame containing the TIM and the link ID bitmap is transmitted at periodic intervals.

15. The non-transitory computer-readable medium of claim 9, wherein the operations further comprise buffer a frame intended for a non-AP Station (STA) when all STAs affiliated with the non-AP MLD are in power save mode.

16. The non-transitory computer-readable medium of claim 9, wherein the buffered BU with a TID is intended for receipt by a non-AP STA affiliated with a non-AP MLD.

17. A method comprising:
- determining a plurality of links between one or more access points (APs) in an AP multi-link device (MLD) and one or more logical non-AP stations (STAs) in a non-AP MLD;
- determining one or more group addressed frames to be sent from the one or more APs of the AP MLD to the one or more non-AP STAs of the non-AP MLD;
- generating a Beacon frame containing a Multi-Link Traffic Indication Map (TIM) element, wherein the TIM element includes a control field variant and a link ID bitmap, each bit of the link ID bitmap corresponding to a link ID of the AP MLD, to indicate a status of buffered group addressed data for the one or more APs in the AP MLD;
- buffering a Buffered Unit (BU) associated with a Traffic Identifier (TID) when the TID is not mapped to any active link for the non-AP MLD;
- buffering a bit in the link ID bitmap of the TIM element to reflect a status of the BU, where the bit corresponds to an Access Identifier (AID) of the non-AP MLD; and
- causing to send the beacon frame to the one or more non-AP STAs of the non-AP MLD.

18. The method of claim 17, further comprising utilizing the TIM element within the Beacon frame to indicate buffered traffic for the non-AP MLD in other links.

19. The method of claim 17, further comprising utilizing a More Data bit in the TIM element within the Beacon frame to indicate an existence of buffered group addressed Buffer Units (BUs).

20. The method of claim 17, further comprising maintaining the latest received Sequence Number (SN) for non-Quality of Service (QOS) group addressed frame.

* * * * *